(12) United States Patent
Drees et al.

(10) Patent No.: US 11,391,480 B2
(45) Date of Patent: Jul. 19, 2022

(54) SYSTEMS AND METHODS FOR FREEZE PROTECTION OF A COIL IN AN HVAC SYSTEM

(71) Applicant: Johnson Controls Technology Company, Auburn Hills, MI (US)

(72) Inventors: Kirk H. Drees, Cedarburg, WI (US); Homero L. Noboa, Waukesha, WI (US); Brennan H. Fentzlaff, Oconomowoc, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 208 days.

(21) Appl. No.: 16/702,818

(22) Filed: Dec. 4, 2019

(65) Prior Publication Data

US 2021/0172634 A1    Jun. 10, 2021

(51) Int. Cl.
*F24F 11/41* (2018.01)
*F24F 11/76* (2018.01)
(Continued)

(52) U.S. Cl.
CPC .......... *F24F 11/41* (2018.01); *F16K 37/005* (2013.01); *F24F 11/64* (2018.01); *F24F 11/76* (2018.01); *F24F 11/88* (2018.01); *F24F 11/89* (2018.01)

(58) Field of Classification Search
CPC ...... F25B 47/006; F25B 47/02; F25B 47/022; F25B 47/025; F25B 47/027; F25B 2700/11; F25B 2347/023; F24F 11/41
See application file for complete search history.

(56) References Cited

U.S. PATENT DOCUMENTS

| | | | |
|---|---|---|---|
| 3,946,757 A | 3/1976 | Wallace | |
| 4,158,291 A | * 6/1979 | Jones | ........................ F24T 10/30 60/641.1 |

(Continued)

FOREIGN PATENT DOCUMENTS

| | | |
|---|---|---|
| CH | 711558 A1 | 3/2017 |
| CN | 2777312 Y | 5/2006 |

(Continued)

OTHER PUBLICATIONS

Belimo Aircontrols (USA), Inc. "Belimo Energy Valve Technical Documentation," www.EnergyValve.com (Apr. 2017).

(Continued)

*Primary Examiner* — Nelson J Nieves
(74) *Attorney, Agent, or Firm* — Foley & Lardner LLP

(57) ABSTRACT

A freeze protection system for a heating, ventilation, or air conditioning (HVAC) system is shown. The freeze protection system includes a temperature sensor positioned at an inlet of a coil within which a liquid is at risk of freezing, and a controller comprising a processor and memory. The memory stores instructions that are executed by the processor. The processor is instructed to obtain a measured temperature of the liquid at the inlet of the coil from the temperature sensor, compare the measured temperature of the liquid at the inlet of the coil with a freeze prevention temperature threshold, engage a freeze prevention action in response to a determination that the measured temperature of the liquid at the inlet of the coil is less than or equal to the freeze prevention temperature threshold.

19 Claims, 14 Drawing Sheets

(51) Int. Cl.
*F24F 11/88* (2018.01)
*F24F 11/89* (2018.01)
*F24F 11/64* (2018.01)
*F16K 37/00* (2006.01)

(56) References Cited

U.S. PATENT DOCUMENTS

| | | | |
|---|---|---|---|
| 4,431,020 A | 2/1984 | Kowalski | |
| 5,598,717 A * | 2/1997 | Sakamoto | F24F 11/30 62/211 |
| 5,904,292 A | 5/1999 | McIntosh | |
| 6,343,617 B1 | 2/2002 | Tinsley et al. | |
| 6,352,106 B1 | 3/2002 | Hartman | |
| 7,096,093 B1 | 8/2006 | Hansen et al. | |
| 7,231,931 B2 | 6/2007 | Lull et al. | |
| 7,266,427 B2 | 9/2007 | Hansen et al. | |
| 7,434,477 B2 | 10/2008 | Lull et al. | |
| 7,798,170 B2 | 9/2010 | Hotz et al. | |
| 8,109,289 B2 | 2/2012 | Trnka et al. | |
| 8,833,384 B2 | 9/2014 | Burt | |
| 9,658,628 B2 | 5/2017 | Burt | |
| 9,874,880 B2 | 1/2018 | Thuillard et al. | |
| 10,359,208 B2 | 7/2019 | Drees et al. | |
| 2002/0117214 A1 | 8/2002 | Tucker et al. | |
| 2003/0125840 A1 | 7/2003 | Lunzman | |
| 2007/0012367 A1 | 1/2007 | Hotz et al. | |
| 2008/0115848 A1 | 5/2008 | Bruck et al. | |
| 2009/0164050 A1 | 6/2009 | Ahmad et al. | |
| 2010/0147394 A1 | 6/2010 | Trnka et al. | |
| 2011/0105012 A1 | 5/2011 | Niederhauser et al. | |
| 2011/0114304 A1 | 5/2011 | Keller | |
| 2011/0162742 A1 | 7/2011 | Ulens et al. | |
| 2011/0315368 A1 * | 12/2011 | Azuma | F25B 47/006 165/287 |
| 2012/0141303 A1 | 6/2012 | Caldwell et al. | |
| 2012/0291460 A1 * | 11/2012 | Aoyagi | F25B 47/025 62/79 |
| 2013/0068313 A1 | 3/2013 | George et al. | |
| 2013/0113402 A1 | 5/2013 | Grabinger et al. | |
| 2013/0199627 A1 | 8/2013 | Gilbert | |
| 2013/0219937 A1 * | 8/2013 | Motomura | F25B 25/005 62/126 |
| 2014/0034145 A1 * | 2/2014 | Burt | F24D 19/0095 137/59 |
| 2014/0067135 A1 | 3/2014 | Lehnert et al. | |
| 2014/0083673 A1 | 3/2014 | Thuillard et al. | |
| 2014/0097367 A1 | 4/2014 | Burt | |
| 2014/0150477 A1 * | 6/2014 | Qu | F25D 21/006 62/80 |
| 2014/0261714 A1 | 9/2014 | Burt | |
| 2014/0277764 A1 | 9/2014 | Burt | |
| 2015/0057810 A1 * | 2/2015 | Smith | G05B 13/024 700/276 |
| 2015/0057816 A1 | 2/2015 | Schick et al. | |
| 2015/0088321 A1 | 3/2015 | Schmidt et al. | |
| 2015/0176931 A1 | 6/2015 | Aeberhard et al. | |
| 2015/0198263 A1 | 7/2015 | Ibsen et al. | |
| 2015/0277447 A1 | 10/2015 | Schmidt | |
| 2016/0054741 A1 | 2/2016 | Thuillard et al. | |
| 2016/0139608 A1 | 5/2016 | Eickhoff | |
| 2016/0246306 A1 | 8/2016 | Giubertoni | |
| 2017/0029256 A1 | 2/2017 | Das et al. | |
| 2017/0227134 A1 | 8/2017 | Tuineag | |
| 2018/0238577 A1 | 8/2018 | Drees et al. | |
| 2018/0239371 A1 | 8/2018 | Drees et al. | |
| 2018/0372361 A1 * | 12/2018 | Fukumoto | F24F 11/46 |
| 2019/0226706 A1 * | 7/2019 | Liu | F24F 1/0018 |
| 2021/0071923 A1 * | 3/2021 | An | F24F 11/86 |
| 2021/0190402 A1 * | 6/2021 | Was | F25B 47/022 |
| 2021/0208611 A1 | 7/2021 | Trikha et al. | |

FOREIGN PATENT DOCUMENTS

| | | |
|---|---|---|
| CN | 1837996 A | 9/2006 |
| CN | 1862421 A | 11/2006 |
| CN | 200968437 Y | 10/2007 |
| CN | 201011392 Y | 1/2008 |
| CN | 201310667 Y | 9/2009 |
| CN | 201330874 Y | 10/2009 |
| CN | 201902628 U | 7/2011 |
| CN | 202349311 U | 7/2012 |
| DE | 22 16 464 A1 | 10/1973 |
| DE | 35 33 160 A1 | 3/1986 |
| DE | 41 40 408 A1 | 6/1993 |
| DK | 201400014 A1 | 1/2015 |
| EP | 2 395 289 A2 | 12/2011 |
| EP | 2 423 607 A2 | 2/2012 |
| GB | 2 544 799 A | 5/2017 |
| WO | WO-98/25096 A1 | 6/1998 |
| WO | WO-2006/015220 A2 | 2/2006 |
| WO | WO-2012/065275 A1 | 5/2012 |
| WO | WO-2014/033496 A1 | 3/2014 |
| WO | WO-2017/050588 A1 | 3/2017 |
| WO | WO-2017/060031 A1 | 4/2017 |

OTHER PUBLICATIONS

Henz ( et al.), "Improving Campus Chilled Water Systems with Intelligent Control Valves: A Field Study," AEI ASCE, p. 102-111 (2013).

* cited by examiner

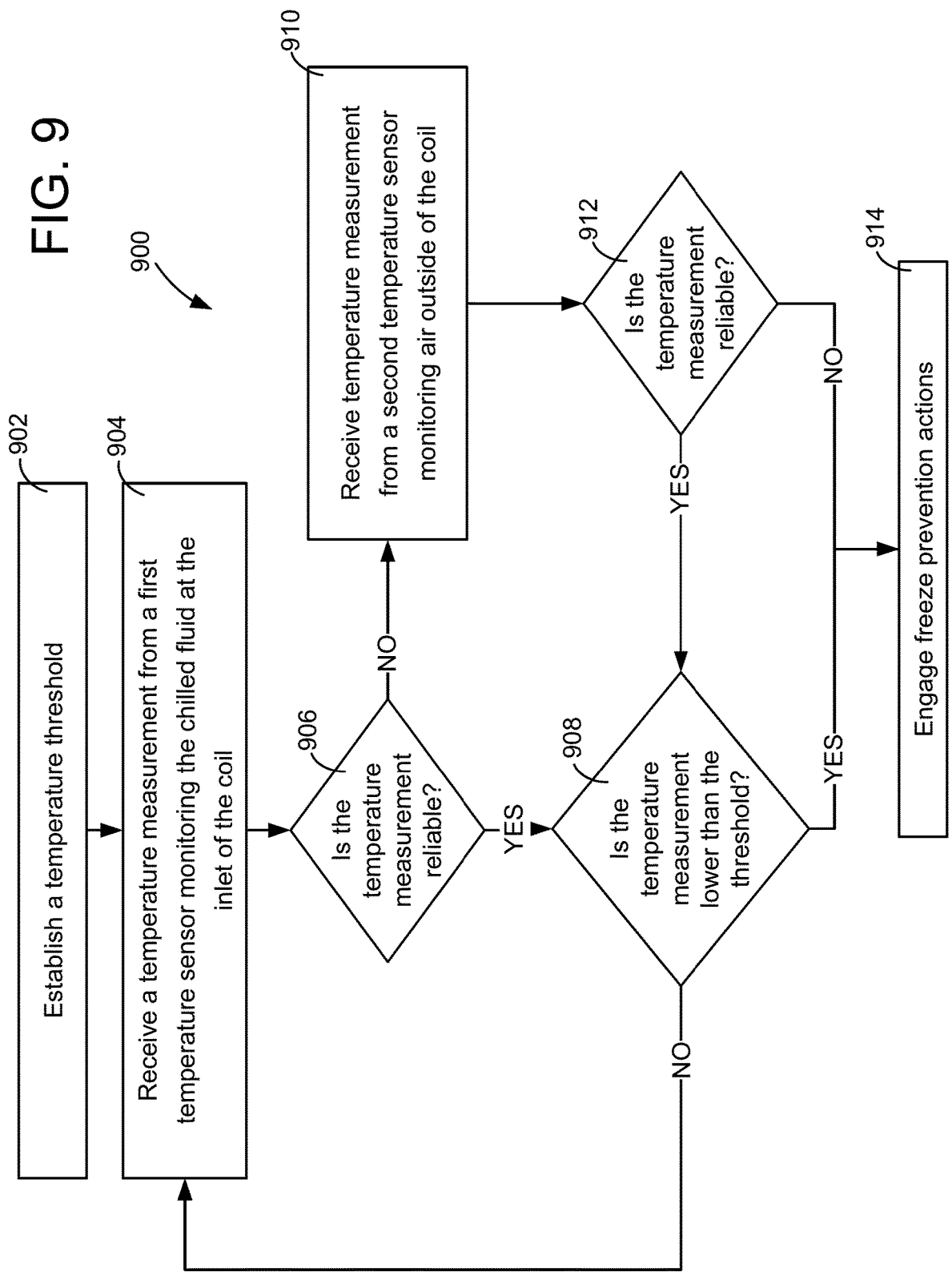

SYSTEMS AND METHODS FOR FREEZE PROTECTION OF A COIL IN AN HVAC SYSTEM

BACKGROUND

The present disclosure relates generally to building control systems and more particularly to control systems configured to monitor and prevent freezing within coils (e.g., heat exchanger coils) inside of a building HVAC system.

In general, building HVAC systems include one more pieces of heating/cooling subsystems to service the thermal energy loads of a building. These subsystems may require the working fluid in the piping of the subsystem to be heated or cooled. In some cases, a chiller chills a fluid to lower the air temperature within a building. This chilled fluid may go through a cooling coil to absorb heat from within a building air handling system. The fluid may also by heated and pumped through a heating coil to reject heat into a building air handling system.

The temperature of the fluid entering a coil may be important to measure to prevent freezing within the coil. Conventional methods implement an air temperature sensor inside of the air duct in which the coil is located. This provides a temperature of the air within the air duct and is used as feedback to determine if the temperature measurements are indicative of safe operation. However, the air temperature sensor is not able to measure the temperature of the fluid directly. It would be beneficial to include a means of measuring the water temperature directly to receive more accurate measurements and performing a method based on these more accurate measurements to optimally and efficiently prevent freezing within the coils.

SUMMARY

One implementation of the present disclosure is a freeze protection system for a heating, ventilation, or air conditioning (HVAC) system. The freeze protection system includes a temperature sensor positioned at an inlet of a coil within which a liquid is at risk of freezing, and a controller comprising a processor and memory. The memory stores instructions that are executed by the processor. The processor is instructed to obtain a measured temperature of the liquid at the inlet of the coil from the temperature sensor, compare the measured temperature of the liquid at the inlet of the coil with a freeze prevention temperature threshold, engage a freeze prevention action in response to a determination that the measured temperature of the liquid at the inlet of the coil is less than or equal to the freeze prevention temperature threshold.

In some embodiments, the system further includes a valve operable to control a flow rate of the liquid through the coil. The system may further include having the freeze prevention temperature threshold equal to a freeze temperature at which the liquid is predicted to freeze plus a safety temperature. The system may further include operating the valve to increase the flow rate of the liquid through the coil.

In some embodiments, the system further includes a fan or damper operable to control a velocity of an airflow across the coil. The system may further include having the freeze prevention temperature threshold equal to a freeze temperature at which the liquid is predicted to freeze and operating the fan or the damper to decrease the velocity of the airflow across the coil.

In some embodiments, the freeze prevention temperature threshold is a multi-tiered threshold comprising a first freeze prevention temperature threshold and a second freeze prevention temperature threshold less than the first freeze prevention temperature threshold. The controller may further engage a first freeze prevention action in response to a determination that the measured temperature of the liquid at the inlet of the coil is less than or equal to the first freeze prevention temperature threshold. The controller may further engage a second freeze prevention action, different from the first freeze prevention action, in response to a determination that the measured temperature of the liquid at the inlet of the coil is less than or equal to the second freeze prevention temperature threshold.

In some embodiments, the system further comprises a valve operable to control a flow rate of the liquid through the coil. The controller may further use a heat transfer model for the coil to calculate a threshold flow rate of the liquid through the coil sufficient to prevent the liquid from freezing within the coil as a function of the measured temperature of the liquid at the inlet of the coil. The controller may further operate the valve such that the flow rate of the liquid through the coil is at least the threshold flow rate calculated using the heat transfer model.

In some embodiments, the controller is configured to determine whether the measured temperature of the liquid at the inlet of the coil is unreliable and in response to a determination that the measured temperature of the liquid at the inlet of the coil is unreliable, switch to using a measured temperature of an airflow with which the liquid exchanges heat within the coil instead of the measured temperature of the liquid at the inlet of the coil to determine whether to engage the freeze prevention action.

In some embodiments, the liquid is stagnant within the coil prior to engaging the freeze prevention action and begins flowing through the coil as a result of engaging the freeze prevention action.

Another implementation of the present disclosure is a freeze protection controller for a heating, ventilation, or air conditioning (HVAC) system. The freeze protection controller includes a processor and memory. The memory stores instructions that are executed by the processor. The instructions cause the processor to obtain a measured temperature of a liquid at an inlet of a coil within which the liquid is at risk of freezing from a temperature sensor positioned to measure the temperature of the liquid at the inlet of the coil. The instructions further cause the processor to compare the measured temperature of the liquid at the inlet of the coil with a freeze prevention temperature threshold. The instructions further cause the processor to engage a freeze prevention action in response to a determination that the measured temperature of the liquid at the inlet of the coil is less than or equal to the freeze prevention temperature threshold.

In some embodiments, the freeze prevention temperature threshold is equal to a freeze temperature at which the liquid is predicted to freeze plus a safety temperature, wherein engaging the freeze prevention action comprises operating a valve to increase a flow rate of the liquid through the coil, wherein the valve is operable to control the flow rate of the liquid through the coil.

In some embodiments, the freeze prevention temperature threshold is equal to a freeze temperature at which the liquid is predicted to freeze, wherein engaging the freeze prevention action comprises operating a fan or a damper to decrease a velocity of an airflow across the coil, wherein the fan or the damper are operable to control the velocity of the airflow across the coil.

In some embodiments, the freeze prevention temperature threshold is a multi-tiered threshold comprising a first freeze prevention temperature threshold and a second freeze prevention temperature threshold less than the first freeze prevention temperature threshold. The instructions further cause the processor to engage a first freeze prevention action in response to a determination that the measured temperature of the liquid at the inlet of the coil is less than or equal to the first freeze prevention temperature threshold engage a second freeze prevention action, different from the first freeze prevention action, in response to a determination that the measured temperature of the liquid at the inlet of the coil is less than or equal to the second freeze prevention temperature threshold.

In some embodiments, the instructions cause the processor to use a heat transfer model for the coil to calculate a threshold flow rate of the liquid through the coil sufficient to prevent the liquid from freezing within the coil as a function of the measured temperature of the liquid at the inlet of the coil and operate a valve such that a flow rate of the liquid through the coil is at least the threshold flow rate calculated using the heat transfer model.

In some embodiments, the instructions cause the processor to determine whether the measured temperature of the liquid at the inlet of the coil is unreliable and in response to a determination that the measured temperature of the liquid at the inlet of the coil is unreliable, switch to using a measured temperature of an airflow with which the liquid exchanges heat within the coil instead of the measured temperature of the liquid at the inlet of the coil to determine whether to engage the freeze prevention action.

In some embodiments, the liquid is stagnant within the coil prior to engaging the freeze prevention action and begins flowing through the coil as a result of engaging the freeze prevention action.

Another implementation of the present disclosure is method for preventing a liquid from freezing inside a coil of a heating, ventilation, or air conditioning (HVAC) system. The method includes measuring a temperature of the liquid at an inlet of the coil, comparing the measured temperature of the liquid at the inlet of the coil with a freeze prevention temperature threshold, and engaging a freeze prevention action in response to a determination that the measured temperature of the liquid at the inlet of the coil is less than or equal to the freeze prevention temperature threshold.

In some embodiments, the method further includes equaling the freeze prevention temperature threshold to a freeze temperature at which the liquid is predicted to freeze plus a safety temperature, wherein engaging the freeze prevention action comprises operating a valve to increase a flow rate of the liquid through the coil, wherein the valve is operable to control the flow rate of the liquid through the coil.

In some embodiments, the method further includes equaling the freeze prevention temperature threshold to a freeze temperature at which the liquid is predicted to freeze, wherein engaging the freeze prevention action comprises operating a fan or damper to decrease a velocity of an airflow across the coil, wherein the fan or the damper are operable to control the velocity of the airflow across the coil.

In some embodiments, the method further includes establishing the freeze prevention temperature threshold as a multi-tiered threshold comprising a first freeze prevention temperature threshold and a second freeze prevention temperature threshold less than the first freeze prevention temperature threshold. The method further includes engaging a first freeze prevention action in response to a determination that the measured temperature of the liquid at the inlet of the coil is less than or equal to the first freeze prevention temperature threshold. The method further includes engaging a second freeze prevention action, different from the first freeze prevention action, in response to a determination that the measured temperature of the liquid at the inlet of the coil is less than or equal to the second freeze prevention temperature threshold.

In some embodiments, the method further includes using a heat transfer model for the coil to calculate a threshold flow rate of the liquid through the coil sufficient to prevent the liquid from freezing within the coil as a function of the measured temperature of the liquid at the inlet of the coil and operating a valve such that a flow rate of the liquid through the coil is at least the threshold flow rate calculated using the heat transfer model, wherein the valve is operable to control the flow rate of the liquid through the coil.

In some embodiments, the method further includes determining whether the measured temperature of the liquid at the inlet of the coil is unreliable. The method further includes, in response to a determination that the measured temperature of the liquid at the inlet of the coil is unreliable, switching to using a measured temperature of an airflow with which the liquid exchanges heat within the coil instead of the measured temperature of the liquid at the inlet of the coil to determine whether to engage the freeze prevention action.

BRIEF DESCRIPTION OF THE DRAWINGS

FIG. 9 is a flow diagram of a process to prevent freezing inside of an HVAC system which can be used as part of the flow control system of FIGS. 5A-B, according to some embodiments.

DETAILED DESCRIPTION

Overview

Figure 1:
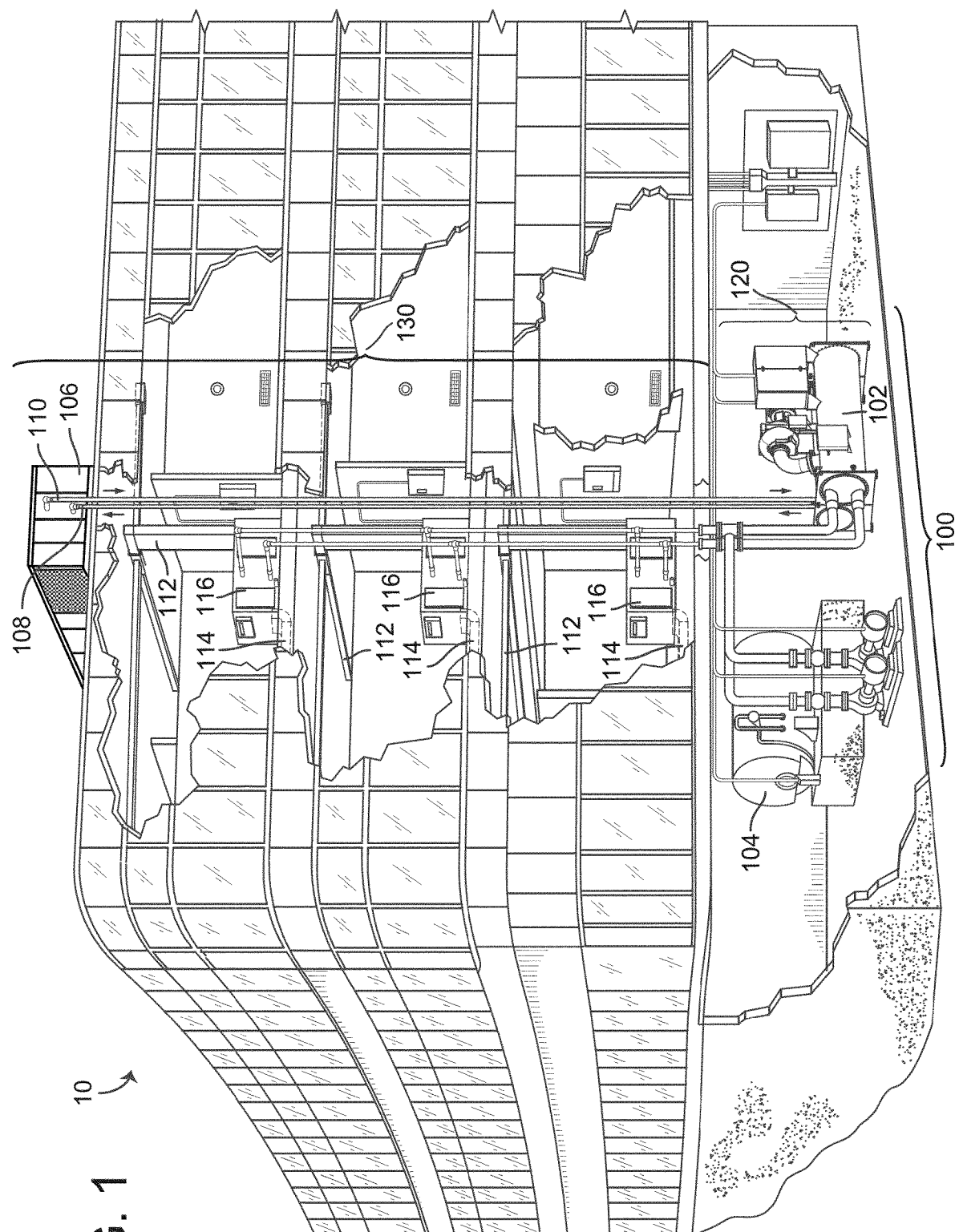
FIG. 1 is a drawing of a building equipped with a HVAC system, according to some embodiments.

Referring generally to the FIGURES, a control system in a building is shown. Buildings may include HVAC systems that can be configured to monitor and control temperature within one or more building zones by means of a fluid conditioning system (e.g., waterside system). Waterside systems may include chillers that generate chilled fluid as a means of absorbing heat from air within a building. This may be done using heat exchanger coils (e.g., cooling coils, heating coils, etc.), where heated or ambient air is blown over the heat exchanger to transfer heat from the air to the chilled fluid by means of convection. Temperature sensors can be mounted proximate to the coils at the inlet of the heat exchangers to monitor for freezing temperatures of the chilled fluid. The temperature sensors may monitor the chilled fluid directly, rather than monitoring the air temperature at or around the heat exchanger coil. In the event that chilled fluid reaches near-freezing temperatures (i.e., a temperature below a set threshold wherein the threshold may be at or near the freezing temperature of the working fluid), the chilled fluid may freeze within the heat exchanger coils and cause issues throughout the waterside system. If the temperature of the chilled fluid drops below a threshold that may indicate freezing, an HVAC controller can perform a set of actions to mitigate any potential or further freezing in the coils.

Implementing a temperature sensor to directly monitor the temperature of the chilled fluid at the inlet of the coil allows for a more accurate reading of the temperature of the fluid. This can increase the probability of observing dangerously low fluid temperatures prior to freezing, and implementing freeze prevention actions prior to or during the freezing of the fluid. This method reduces potential HVAC operational issues such as broken heat exchanger coils or lower fluid pressure within the waterside system. This method further reduces energy costs, as the threshold for freezing is able to be more accurate, and thus closer to the actual freezing temperature of the fluid.

In some embodiments, a process of determining and executing a more accurate means of freeze prevention actions for the heat exchanger coil is shown. In the event that a controller is receiving reliable temperature measurements from a first sensor directly measuring the chilled fluid at the inlet of the coil, the controller may transmit control signals based on the measurements from the first sensor. When the first sensor provides reliable measurements that are above a temperature threshold, the threshold at or near freezing temperatures, the controller does not perform preventative freezing actions. When the temperature readings from the first sensor falls below the threshold, freeze prevention actions may be established.

In the event that the controller is receiving unreliable temperature measurements from the first sensor, the controller may rely on temperature readings from a second sensor. This second sensor may measure the temperature of the air around the coil, or the outside air temperature (OAT). The method implementing the second sensor may be less accurate, but may act as a fail-safe in the event the first sensor malfunctions.

The term "unreliable" as used herein may refer to inconsistent readings provided by a sensor or inaccurate readings due to a sensor malfunction. The term "abnormal," as used herein, may refer to temperature readings that are significantly higher or lower than a baseline temperature. The baseline temperature reading may be determined by another sensor used to measure the temperature of the chilled fluid and act as a reference, or may be a set temperature (e.g., 6° C.). In the event that the baseline temperature reading acts as a set temperature, an "unreliable" reading may be determined by a certain percentage difference between the two measurements (e.g., 20% error from baseline temperature). The term "unreliable" may also refer to situations where temperature readings are volatile (i.e., there are several changes in temperature readings in a short period of time) or the temperature readings are indicative of measuring noise (e.g., random white Gaussian noise).

Building with HVAC System

Referring now to FIG. 1, a perspective view of a building 10 is shown. Building 10 is served by a building automation system (BAS). A BAS is, in general, a system of devices configured to control, monitor, and manage equipment in or around a building or building area. A BAS can include, for example, a HVAC system, a security system, a lighting system, a fire alerting system, or any other system that is capable of managing building functions or devices, or any combination thereof.

The BAS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 is replaced with a central energy plant such as central plant 200, described with reference to FIG. 2.

Still referring to FIG. 1, HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via air supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Central Plant and Control System

Figure 2:
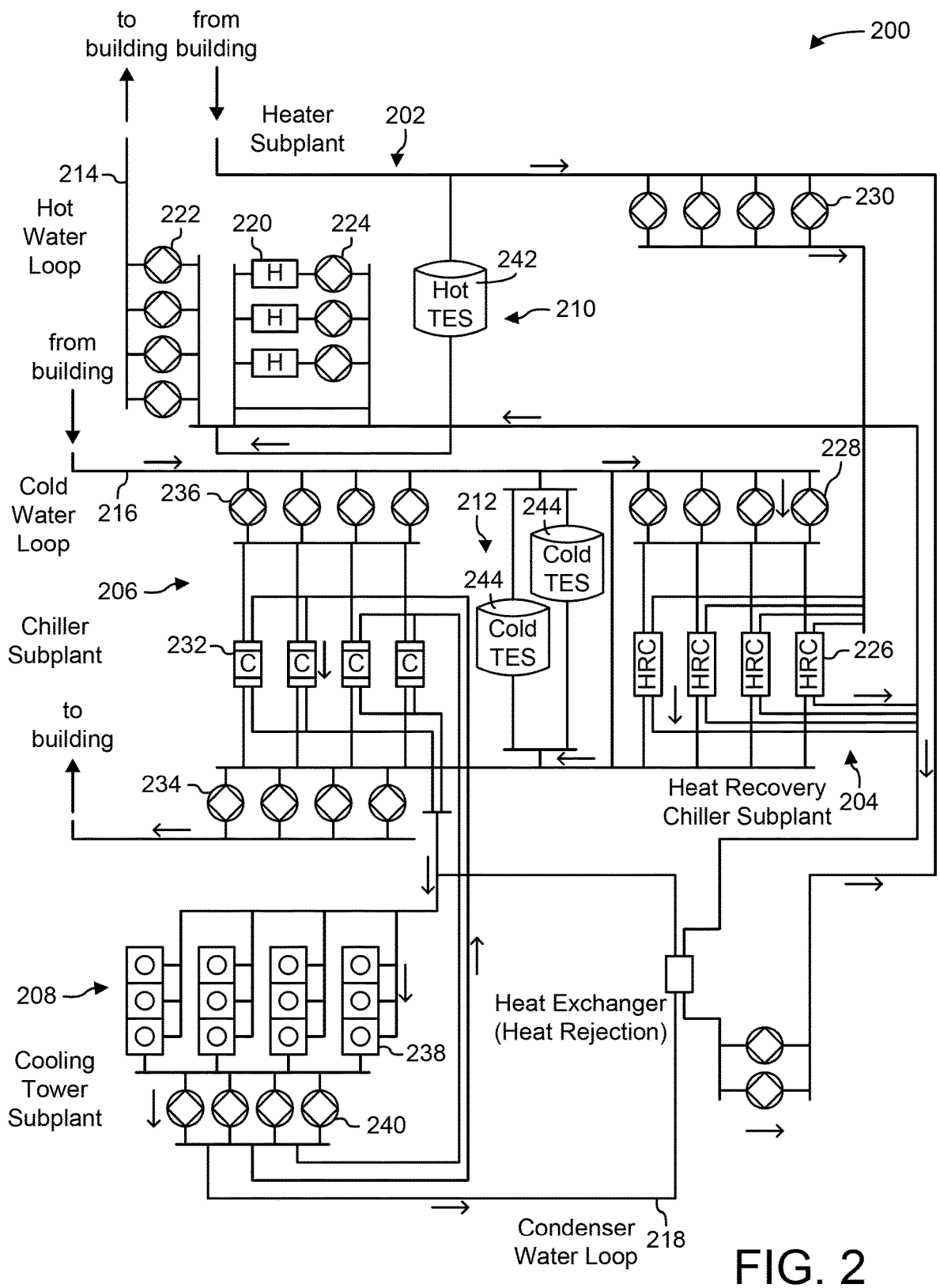
FIG. 2 is a schematic of a waterside system which can be used as part of the HVAC system of FIG. 1, according to some embodiments.

Referring now to FIG. 2, a block diagram of a central plant 200 is shown, according to an exemplary embodiment. In brief overview, central plant 200 may include various types of equipment configured to serve the thermal energy loads of a building or campus (i.e., a system of buildings). For example, central plant 200 may include heaters, chillers, heat recovery chillers, cooling towers, or other types of equipment configured to serve the heating and/or cooling loads of a building or campus. Central plant 200 may consume resources from a utility (e.g., electricity, water, natural gas, etc.) to heat or cool a working fluid that is circulated to one or more buildings or stored for later use (e.g., in thermal energy storage tanks) to provide heating or cooling for the buildings. In various embodiments, central plant 200 may supplement or replace waterside system 120 in building 10 or may be implemented separate from building 10 (e.g., at an offsite location).

Central plant 200 is shown to include a plurality of subplants 202-212 including a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to central plant 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in central plant 200 (e.g., pumps 222, 224, 228, 230, 234, 236, and/or 240) or pipelines in central plant 200 include an isolation valve associated therewith. Isolation valves may be integrated with the pumps or positioned upstream or downstream of the pumps to control the fluid flows in central plant 200. In various embodiments, central plant 200 may include more, fewer, or different types of devices and/or subplants based on the particular configuration of central plant 200 and the types of loads served by central plant 200.

Figure 3:
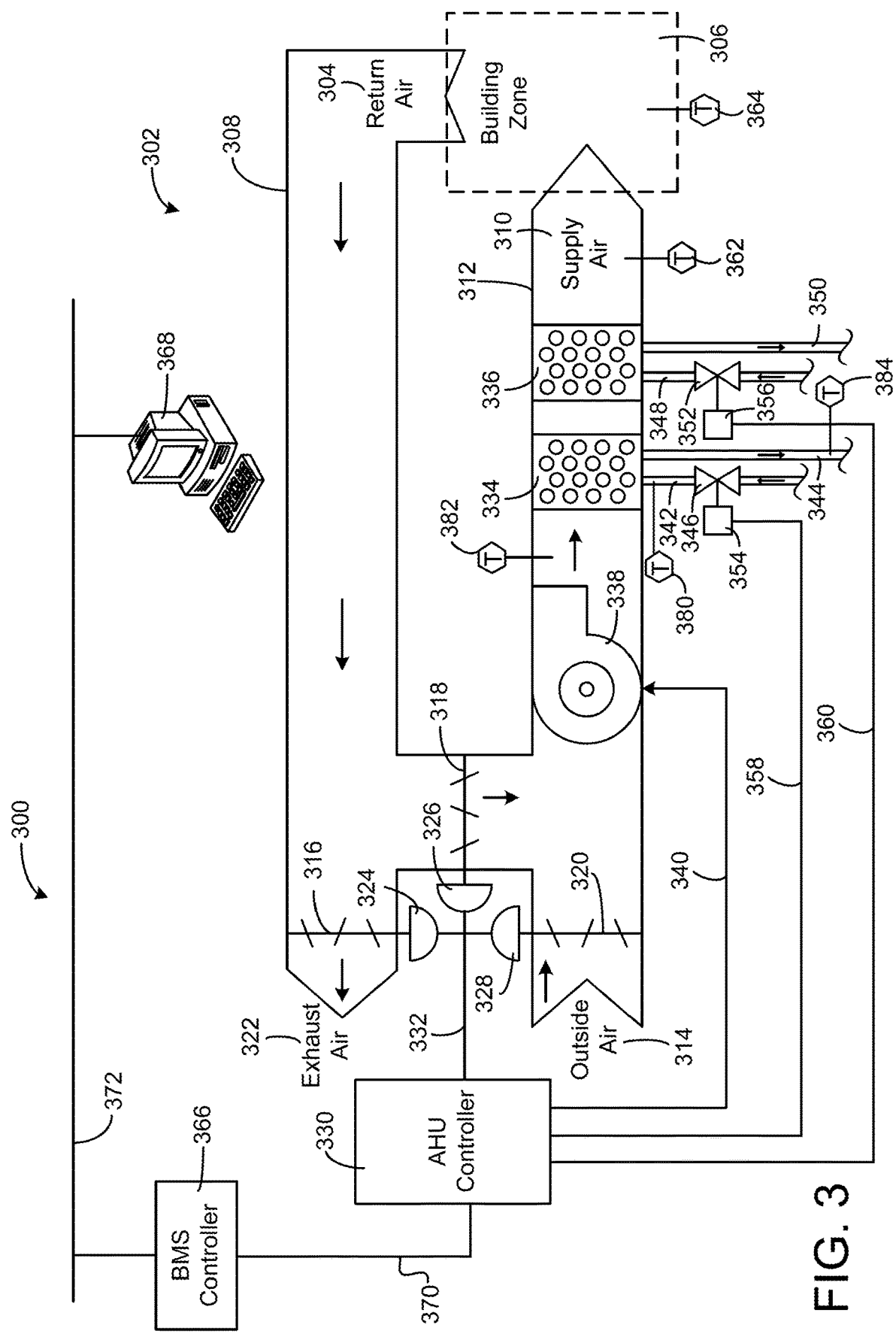
FIG. 3 is a block diagram of an airside system which can be used as part of the HVAC system of FIG. 1, according to some embodiments.

Referring now to FIG. 3, a block diagram of an airside system 300 is shown, according to an example embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, duct 112, duct 114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include inlet temperature sensor 380, outside air temperature (OAT) sensor 382, and outlet temperature sensor 384. In some embodiments, inlet temperature sensor 380 is configured to record temperature measurements and transmit the measurements to a building controller (e.g., AHU controller 330, BMS controller 366, etc.). Inlet temperature sensor 380 may transmit temperature measurements by means of wired or wireless connections. For example, inlet temperature sensor 380 may include a Wi-Fi module that allows inlet temperature sensor 380 to wirelessly transmit temperature measurements to AHU controller 330. Inlet temperature sensor 380 may be configured to record temperature measurements at the inlet of cooling coil 334. This may result in inlet temperature sensor 380 directly recording temperatures of the fluid within piping 342. In such an embodiment, this would result in inlet temperature sensor 380 recording more accurate temperature measurements of the fluid when compared to recording temperature measurements near the fluid (e.g., of the surrounding air), which may act as an approximation of the temperature of the fluid. While not shown in FIG. 3, inlet temperature sensor 380 may also be installed at the inlet of heating coil 336. In some embodiments, both cooling coil 334 and heating coil 336 have an inlet temperature sensor 380 located at their respective inlets.

In some embodiments, OAT sensor 382 is configured to record the general air temperature of air supplied by outside air 314. In these embodiments, OAT sensor 382 may be located at any point inside of supply air duct 312. In other embodiments, OAT sensor 382 is configured to record temperature measurements of air surrounding the coils (i.e., cooling coil 334 and heating coil 336) within airside system 300 and transmit the measurements to a building controller (e.g., AHU controller 330, BMS controller 366, etc.). Inlet temperature sensor 380 may transmit temperature measurements by means of wired or wireless connections. OAT sensor 382 may then be located directly near cooling coil 334 and be configured to monitor the temperature of the air near cooling coil 334, as shown in FIG. 3. In various embodiments, OAT sensor 382 may be configured to monitor the temperature of the air near cooling coil 334 to act as an approximation of the temperature of the fluid within piping 342. In these embodiments, the air temperatures recorded by OAT sensor 382 may be substantially different than the temperature measurements recorded by a sensor directly monitoring the temperature of the fluid within piping 342 (e.g., inlet temperature sensor 380).

For example, the temperature of a water-glycol mixed fluid (e.g., "the fluid") has been chilled by chiller 232 within waterside system 200 and is piped through piping 342 to cooling coil 334. At an instance in time, inlet temperature sensor 380 records the temperature of the fluid being 0.4° C. (33° F.), indicating that the temperature of the fluid is currently 0.4° C. OAT sensor 382, at the same instance in time, records the temperature of the air near cooling coil 334 being 2.2° C. (36° F.), indicating that the temperature of the fluid is approximately 2.2° C. This exemplified embodiment further includes a temperature threshold, 1.5° C. (35° F.), such that when a temperature measurement is received by a controller (e.g., AHU controller 330) that is below the temperature threshold, an action to increase the temperature of the fluid is taken, in an effort to prevent freezing. The fluid is then below the temperature threshold, as indicated by inlet temperature sensor 380 directly measuring the temperature of the fluid. However, if OAT sensor 382 transmits the temperature measurement to AHU controller 330 rather than inlet temperature sensor 380, no action would be taken as the temperature measurement from OAT sensor 382 was above the temperature threshold. This may result is potential damage within coils 334, 336. Similar embodiments are discussed in greater detail with reference to FIG. 7.

Outlet temperature sensor 384 may be configured to record temperature measurements and transmit the measurements to a building controller (e.g., AHU controller 330, BMS controller 366, etc.). Outlet temperature sensor 384 may transmit temperature measurements by means of wired or wireless connections. Inlet temperature sensor 380 may be configured to record temperature measurements at the inlet of cooling coil 334. This may result in inlet temperature sensor 380 directly recording temperatures of the fluid within piping 342. While not shown in FIG. 3, airside system 300 may also include a flow sensor within piping 342 (or similarly piping 348), which may be configured to record flow measurements of the fluid.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362 and 364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
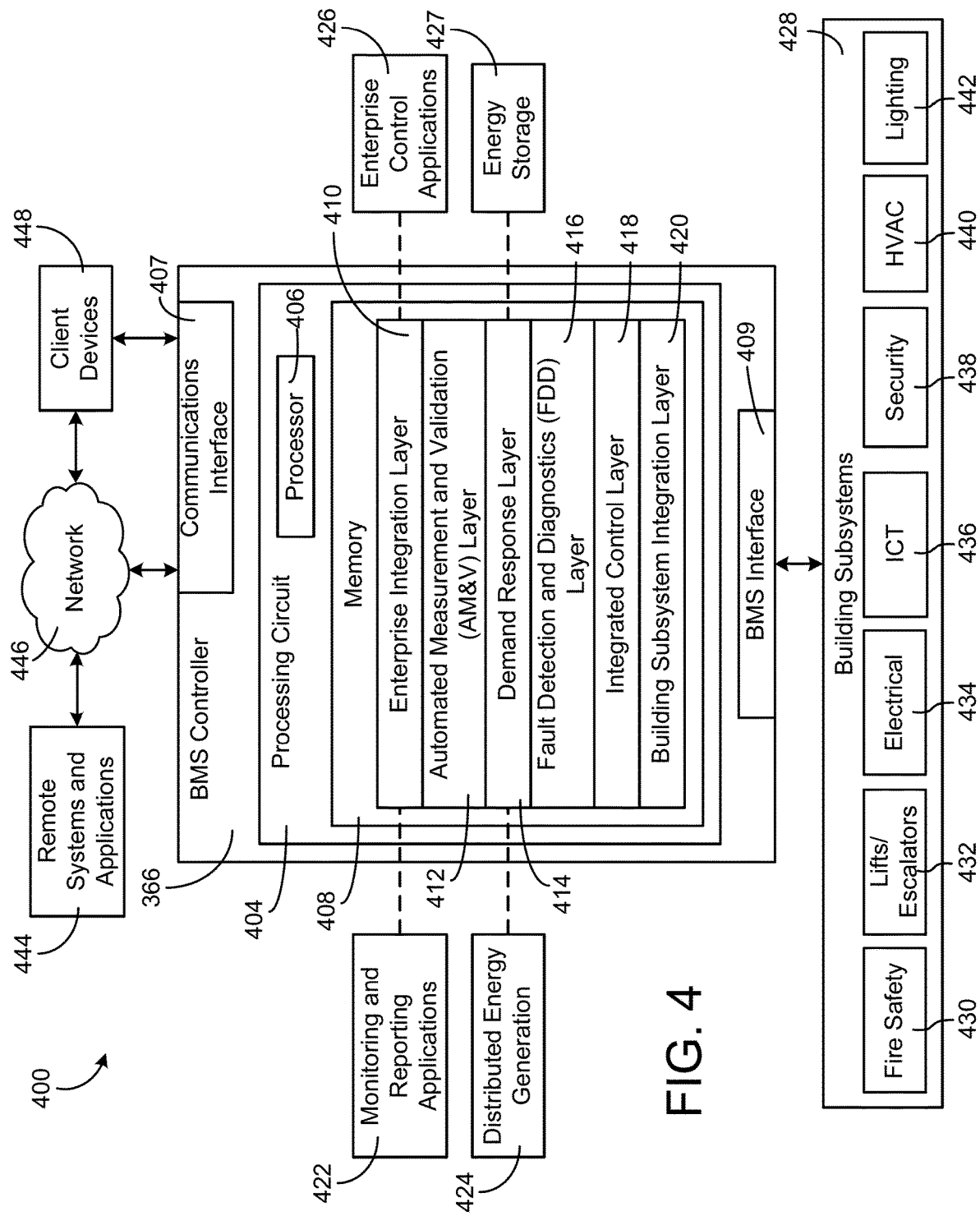
FIG. 4 is a block diagram of a BMS which can be used in the building of FIG. 1, according to some embodiments.

Referring now to FIG. 4, a block diagram of a building management system (BMS) 400 is shown, according to an example embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an example embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an example embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, ML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an example embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other example embodiments, FDD layer 416 is configured to provide "fault" events to integrated control layer 418 which executes control strategies and policies in response to the received fault events. According to an example embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Chilled Fluid Circuit with External Controller

Figure 5A:
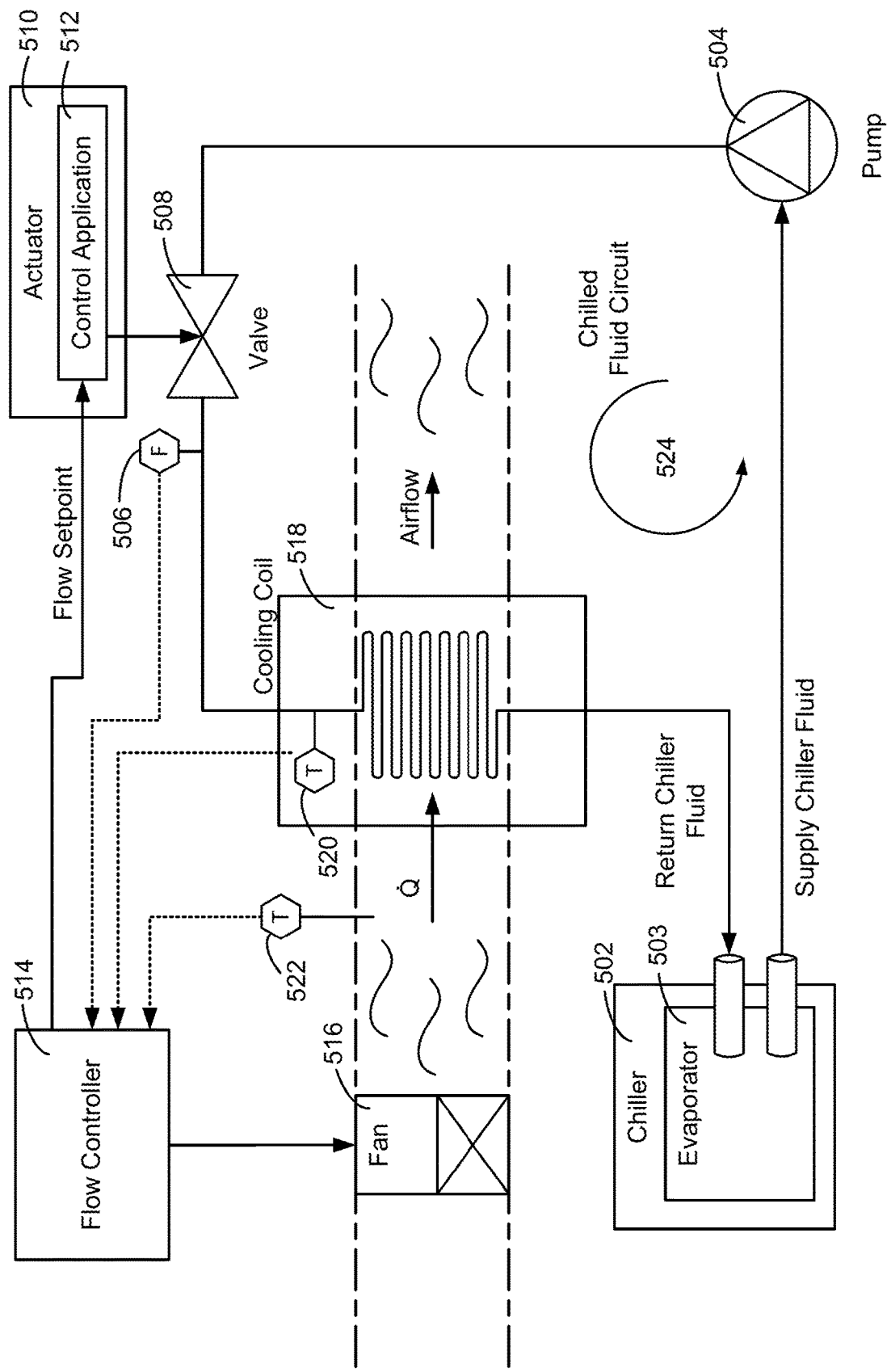
FIG. 5A is a diagram of a flow control system which can be used as part of the HVAC system of FIG. 1, according to some embodiments.

Referring now to FIG. 5A, a block diagram of a flow control system 500 is shown, according to some embodiments. System 500 can be configured to chill and circulate a fluid (e.g., water, water/glycol solution, etc.) within an HVAC system to absorb heat from a building air handler to lower the temperature within a building. System 500 is shown to include a chiller 502, a pump 504, a flow sensor 506, a valve 508, an actuator 510, a flow controller 514, a fan 516, and a coil 518. These components may be similar to chiller 102, pumps 234, fan 338, actuator 354, valve 346, and coil 334 as described above. System 500 is also shown to include an inlet temperature sensor 520 and outside air temperature (OAT) sensor 522.

Chiller 502 is shown to include evaporator 503. Chiller 502, evaporator 503, and pump 504 may work together to cause a chilled fluid to circulate within a chilled fluid loop 524 (e.g., piping or other fluid conduits) that connects chiller 502, pump 504, flow sensor 506, valve 508, and coil 518 in series. The chilled fluid may absorb heat (Q) in coil 518 and reject the heat in evaporator 503. Chiller 502 may be responsible for removing heat from the return chiller fluid and supplying chilled fluid to chilled fluid loop 524. For example, supply chiller fluid may leave the chiller at a first chilled temperature (e.g., 6° C.). When the chilled fluid absorbs heat after flowing through coil 518, the chilled fluid may return to chiller 502 at a second chilled temperature that is higher than the first chilled temperature (e.g., 14° C.). The chiller 502 may use a cooling device (e.g., evaporator 503) to chill the chiller return fluid so it can be pumped back out to chilled fluid loop 524 again at or near its first chilled temperature. Pump 504 may be configured to circulate the chilled fluid within chilled fluid loop 524 and/or pump chilled fluid into chilled fluid loop 524 from a storage tank, such as cold TES tank 244 as shown in FIG. 2.

Coil 518 may be substantially similar to cooling coil 334 and may be configured to transfer heat between one fluid to another medium (e.g., a second fluid, air, etc.). Coil 518 may absorb heat from air provided by fan 516. In some embodiments, coil 518 may act as an evaporator coil as found within chiller 502. In other embodiments, coil 518 is configured to cool the air within an AHU, as shown by cooling coil 334 in FIG. 3. Coil 518 may act as the coil inside of any variety of heat exchangers, including double-pipe heat exchangers, shell and tube heat exchangers, plate heat exchangers, plate and shell heat exchangers, fluid heat exchangers, and any other type. In some embodiments, coil 518 can be any type of heat exchanger and may not be restricted to heat exchangers that have a physical coil shape. In other embodiments, coil 518 coil 518 is not part of any heat exchanger assembly and is a pathway (e.g., pipe, conduit, etc.) for any fluid that is exposed to cold airflow and at risk of freezing when outside temperature is cold.

Figure 5B:
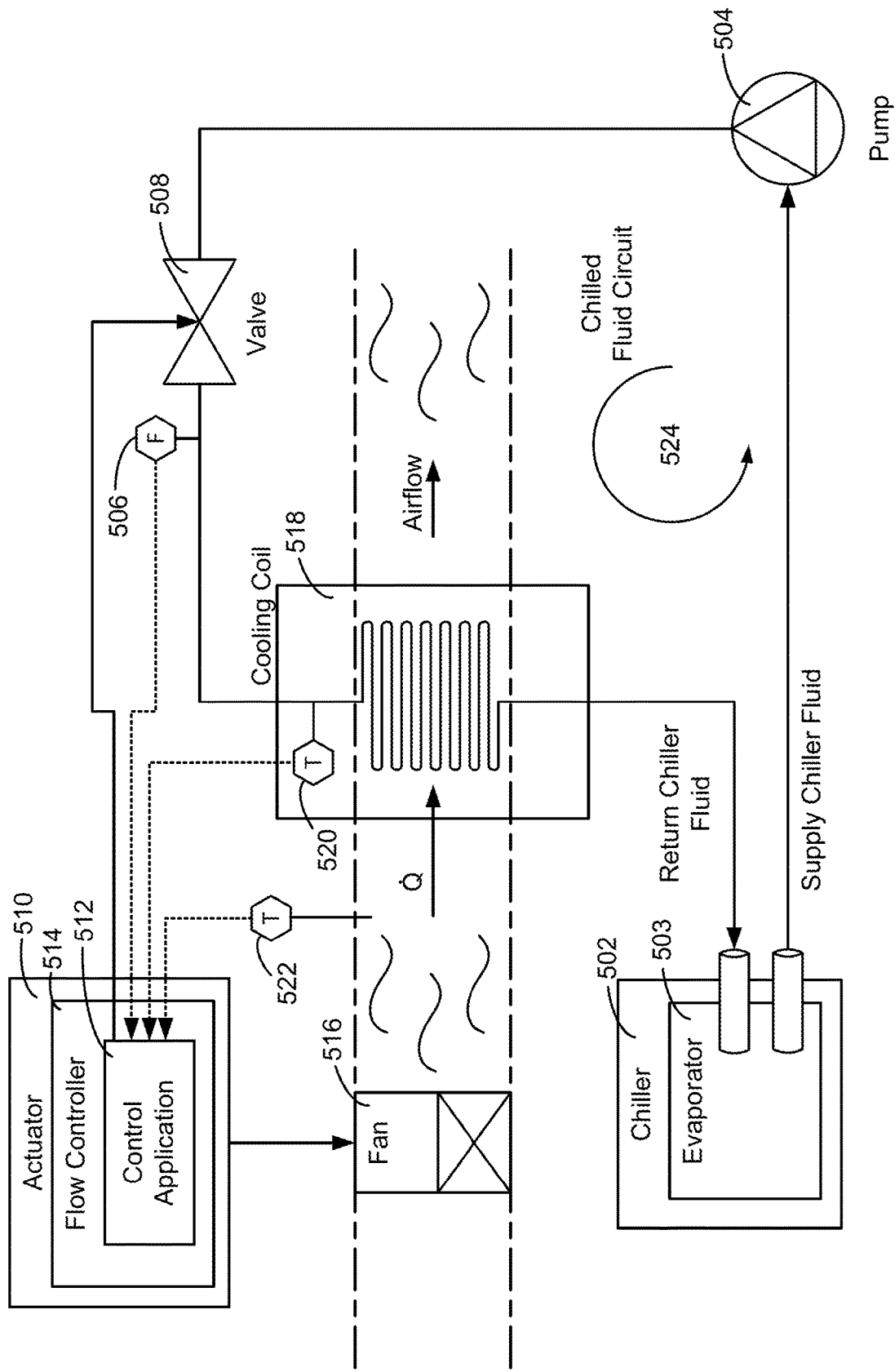
FIG. 5B is a diagram of a flow control system which can be used as part of the HVAC system of FIG. 1, according to some embodiments.

In some embodiments, coil 518 is a shell and tube heat exchanger as depicted in FIGS. 5A-B. Shell and tube heat exchangers may include of a series of tubes which contain fluid that must be either heated or cooled (e.g., chilled fluid). A second fluid (e.g., cold air) runs over the tubes that are being heated or cooled so that it can either provide the heat or absorb the heat required. The tubes may be bundled inside of the heat exchanger in a variety of ways (e.g., plainly, longitudinally finned, etc.). In some embodiments, coil 518 is a specific type of shell and tube heat exchanger known as a finned tube coil. In embodiments wherein coil 518 is a shell and tube heat exchanger, a sensor measuring the temperature of the fluid (e.g., inlet temperature sensor 380) may be located at the inlet of a tube within the heat exchanger. In other embodiments, coil 518 is a trench heater, wherein fluid is brought into the trench heat through a series of tubes (e.g., finned tubes) and surrounding air exchanges heat with the fluid. In other embodiments, coil 518 is an open-coil heating element, wherein highly-resistive metal is supplied with a current to generate heat. The open-coil heating element may then reject heat to the surrounding air. In some embodiments, coil 518 is a microchannel heat exchanger, wherein multiple tubes carry fluid from one header to another while the surrounding air is passed through the heat exchanger to cool the fluid. The headers may contain baffles that control the flow of the fluid. Coil 518 may be a microchannel heat exchanger that includes a significant number of small tubes that allow fluid to flow through and increase the overall surface area of the heat exchanger. In some embodiments, coil 518 is a furnace air evaporator coil, radiator element, convective water heating element, heat pipes, or chilled beam heat exchanger. In various embodiments, coil 518 is any heat exchanger that incorporates one or more tubes within a heat exchanger assembly that allows for the exchange of heat between two or more fluids.

Actuator 510 and valve 508 may be configured to modulate the chilled fluid going into coil 518. Actuator 510 may control valve 508 based on control signals from flow controller 514. Actuator 510 and valve 508 are described in greater detail below.

Flow controller 514 may be configured to receive signals from inlet temperature sensor 520, OAT sensor 522, and flow sensor 506 and transmit control signals to fan 516 and actuator 510. In some embodiments, flow controller 514 is configured to provide a flow setpoint and possibly other data to actuator 510 to engage valve 508 to control the flow through chilled fluid loop 524. Actuator 510 may receive the flow setpoint from flow controller 514 and transmit a valve position command to valve 508 to achieve the flow setpoint. In other embodiments, actuator 510 generates the flow setpoint and transmits a valve position command to valve 508, as shown in FIG. 5B. In some embodiments, actuator 510 may receive data external of system 500 via wireless communicate and transmits the data to flow controller 514. In various embodiments, flow controller 514 may be identical or substantially similar to AHU controller 330 and/or BMS controller 366 as described above.

Valve 508 may be any type of device for controlling the passage of fluid or air through a medium (e.g., pipe, duct, etc.). In some embodiments, valve 508 is configured to modulate an amount of chilled fluid flowing through chilled fluid loop 524. Valve 508 may receive control signals to modulate fluid from actuator 510. In some embodiments, valve 508 has a maximum flow rate such that fluid may not flow through valve 508 at a velocity higher than the maximum flow rate.

Actuator 510 can be configured to actuate (e.g., open, close, adjust, increment, etc.) a valve or other HVAC devices within system 500. Actuator 510 may be configured as a smart device that connects to other devices or networks via wireless protocols (e.g., Bluetooth, Zigbee, NFC, Wi-Fi, Li-Fi, 3G, etc.) that can operate interactively and autonomously. Actuator 510 may communicate through network 446 as shown in FIG. 4, or may be part of a local area network (LAN). Actuator 510 is configured to execute a control application 512 that actuates valve 508, thereby modulating the flow of chilled fluid through coil 518. In some embodiments, actuator 510 may receive control signals from flow controller 514 to actuate valve 508. Actuator 510 would then open or close the valve, based on the control signals from flow controller 514, by means of control application 512. The configuration of actuator 510 is shown in greater detail in FIGS. 6A-B. Actuator is shown to include control application 512. In some embodiments, control application 512 is stored within actuator 510 (e.g., within memory of actuator 510) as shown in FIG. 5A, or control application 512 may be partially or entirely incorporated within flow controller 514, as shown in FIG. 5B. Control application 512 may be developed using a variety of programming languages such as MATLAB, C, Python, Java, etc. The functionality of control application 512 is described in greater detail below.

Other types of actuators that can be used in place of or in addition to actuator 510 are described in greater detail in U.S. Pat. No. 10,359,208 filed on Aug. 24, 2017, the entire disclosure of which is incorporated by reference herein.

Inlet temperature sensor 520 may be substantially similar to inlet temperature sensor 380 and may be configured to record temperature readings of the chilled fluid flowing through coil 518 at or near the inlet to coil 518 and transmit temperature measurements to a control device (e.g., flow controller 514). Inlet temperature sensor 520 may be any sensor capable of measuring the temperature of the chilled fluid at the inlet of coil 518 and transmitting that information back to a control device. In some embodiments, inlet temperature sensor 520 has minimum specification requirements that limit its performance (e.g., minimum readable temperature values). For example, inlet temperature sensor 520 may have a minimum temperature specification of −10° C. In the event that chiller 502 over-chills the fluid to a temperature of −30° C., inlet temperature sensor 520 may be incapable of transmitting an accurate measurement to a control device. This may render the reading unreliable for the control device. In some embodiments, inlet temperature sensor 520 provides unreliable measurements and flow controller 514 begins making control decisions for chilled fluid loop 524 based on measurements from OAT sensor 522.

OAT sensor 522 may be substantially similar to OAT sensor 382 and may be configured to record temperature readings of the air at or near the inlet of coil 518 and transmit temperature measurements to flow controller 514. OAT sensor 522 may also have minimum specification requirements that limit its performance (e.g., minimum readable temperature values) that, when the sensor measures a temperature below the threshold, may render the reading unreliable when transmitted to flow controller 514.

In some embodiments, flow controller 514 may establish a threshold for temperature measurements such that any temperature measurement received from inlet temperature sensor 520 or OAT sensor 522 that is below the established threshold may be considered unreliable. In some embodiments, flow controller 514 may have identical or different thresholds for inlet temperature sensor 520 and OAT sensor 522. In some embodiments, when flow controller 514 is making control decisions based on inlet temperature sensor 520, the threshold for inlet temperature sensor 520 will be used by flow controller 514. In some embodiments, OAT sensor 522 may be considered a less accurate method of measuring the temperature of the chilled fluid. As such, a threshold may be established that is higher than that of the threshold for inlet temperature sensor 520, giving the OAT sensor 522 a greater margin for error. In the event that flow controller 514 switches to making control decisions based on OAT sensor 522 measurements, flow controller 514 would make control decisions based on the threshold established for OAT sensor 522.

Flow sensor 506 can be configured to monitor the flow rate of the chilled fluid within chilled fluid loop 524 and transmit flow measurements back to a control device (e.g., flow controller 514). Flow sensor 506 may couple directly to actuator 510 and/or valve 508. In some embodiments, actuator 510, valve 508, and flow sensor 506 are configured to be part of a single assembly.

Flow controller 514 may be configured to receive temperature readings from inlet temperature sensor 520 and/or OAT sensor 522. Although only two temperature sensors 520, 522 are shown in FIG. 5A, system 500 may include any number of sensors that transmit temperature readings or other types of measurements to flow controller 514. In some embodiments, flow controller 514 obtains a temperature threshold (e.g., from local memory, from flow controller 514, from a user, from an outside data source, etc.) and determines whether the measurements from the temperature sensors (e.g., inlet temperature sensor 520, OAT sensor 522) from sensors are below the temperature threshold. In various embodiments, control application 512 may automatically generate or calculate the temperature threshold or may receive the temperature threshold as external data from flow controller 514. If temperature measurements received from sensors within chilled fluid loop 524 (e.g., inlet temperature sensor 520, OAT sensor 522) drop below the threshold, flow controller 514 may automatically initiate freeze prevention actions to prevent the chilled fluid from freezing within chilled fluid loop 524. In some embodiments, the freeze prevention actions include, but are not limited to, adjusting valve 508 to increase the flow rate of the chilled fluid, shutting off fan 516, or engaging an alarm system. In some embodiments, fan 516 is identical or substantially similar to fan 338, as shown in FIG. 3. Preventative actions may also include notifying a building occupant by means of a transmitted message to a user interface. The transmitted message may include details about the freezing of coil 518, indicators of which preventative freezing actions have been implemented, the extent to which freezing has disrupted HVAC operations, or any combination thereof.

As shown in FIG. 5A, control application 512 may receive a flow setpoint from flow controller 514 and operate valve 508 to achieve the setpoint. For example, control application 512 may receive a flow setpoint from flow controller 514. Control application 512 may then actuate valve 508 to achieve the flow setpoint. In some embodiments, control application 512 is responsible for all or most of the control logic within system 500, which is discussed in greater detail in FIG. 5B.

Chilled Fluid Circuit with Smart Actuator

Referring now to FIG. 5B, another block diagram of a flow control system 500 is shown, according to some embodiments. FIG. 5B generally illustrates a single valve assembly that incorporates flow controller 514 into actuator 510 for a single control assembly for system 500. System 500 is shown to include a chiller 502, a pump 504, a flow sensor 506, a valve 508, an actuator 510, a fan 516, and a coil 518. These components may be similar to chiller 102, pumps 234, fan 338, actuator 354, valve 346, and coil 334 as described above. System 500 is also shown to include an inlet temperature sensor 520 and outside air temperature (OAT) sensor 522.

Actuator 510 is shown to include flow controller 514. Flow controller 514 is shown to include control application 512. In some embodiments, actuator 510 includes an internal controller (e.g., flow controller 514) that is configured to generate its own flow setpoint and actuate valve 508 to achieve the setpoint. Actuator 510 may handle some or all of the control decisions within system 500. For example, sensors 506, 520, and 522 may send data to flow controller 514 inside of actuator 510. Flow controller 514 may then process the sensor information and generate control logic to transmit to fan 516 and/or valve 508. In some embodiments, other types of actuators that can be used in place of or in addition to actuator 510 are described in greater detail in U.S. Pat. No. 10,359,208 filed on Aug. 24, 2017, U.S. patent application Ser. No. 15/901,852 filed on Feb. 21, 2018, and U.S. patent application Ser. No. 15/901,843 filed on Feb. 21, 2018, the entire disclosures of which are incorporated by reference herein.

Figure 5C:
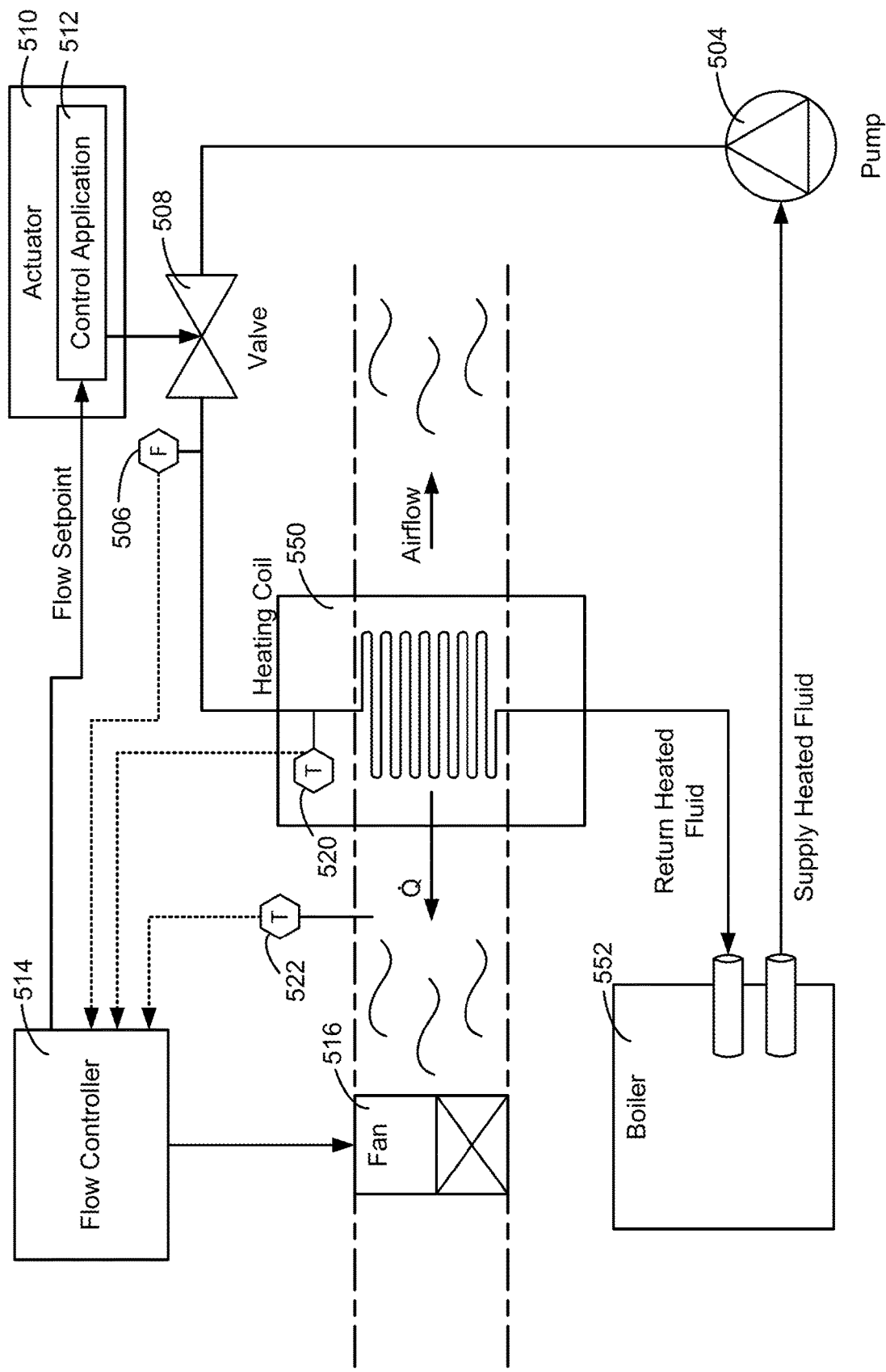
FIG. 5C is a diagram of a flow control system which can be used as part of the HVAC system of FIG. 1, according to some embodiments.
Figure 5D:
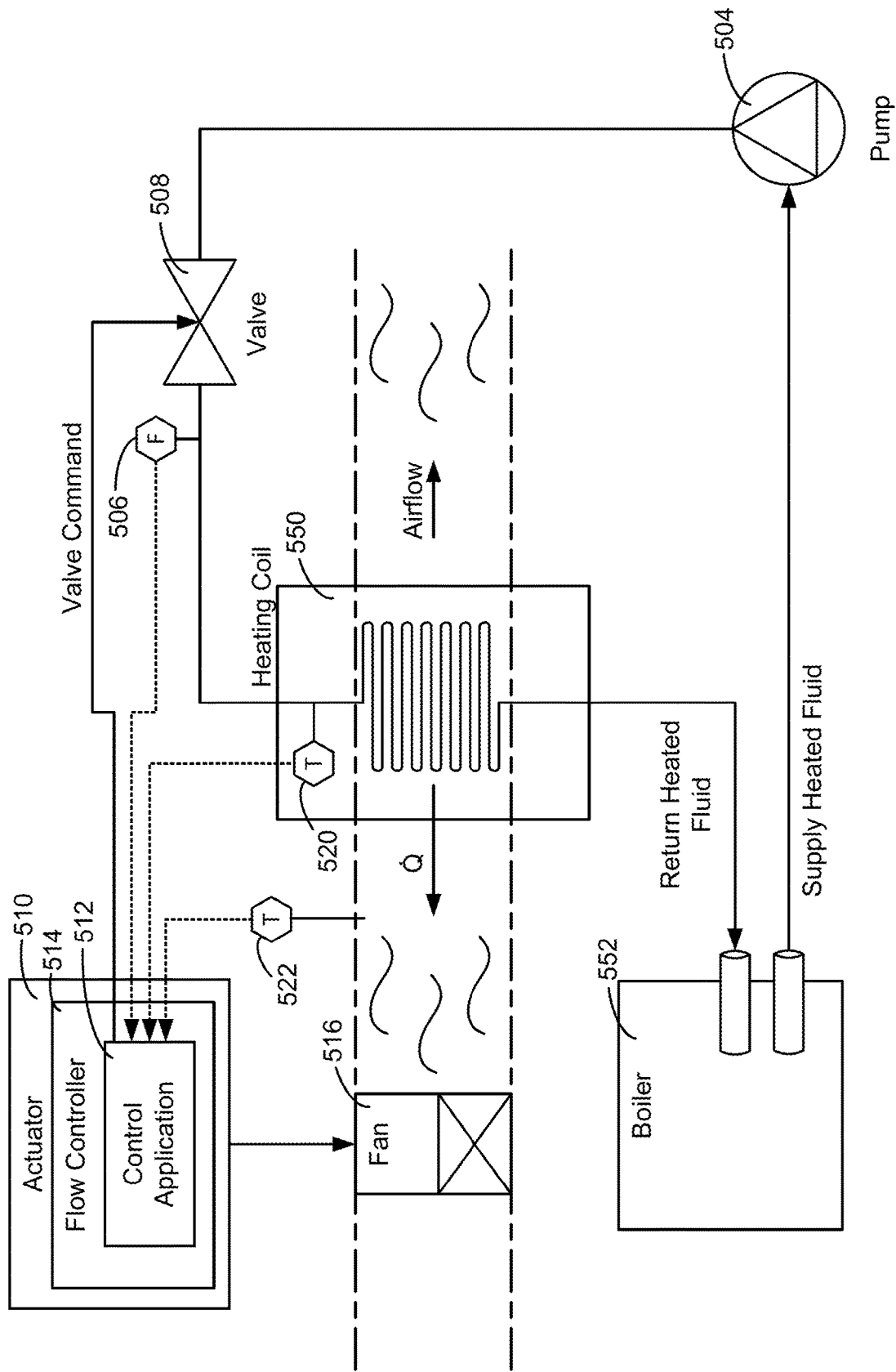
FIG. 5D is a diagram of a flow control system which can be used as part of the HVAC system of FIG. 1, according to some embodiments.

Referring now to FIG. 5C, a block diagram of a flow control system 500 is shown, according to some embodiments. FIG. 5C is shown to include heating coil 550 and boiler 552. System 500 as shown in FIG. 5C may monitor the temperature of heating coil 550 to prevent freezing or boiling inside of heating coil 550. Heating coil 500 may be substantially similar to heating coil 336. FIG. 5C is shown to include an external controller (i.e., flow controller 514) that handles some or all of the control logic to prevent freezing of supply heated fluid within heating coil 550, similar to system 500 as depicted in FIG. 5A. FIG. 5D is shows actuator 510 handling all of the control logic required to prevent freezing in system 500, similar to system 500 as depicted in FIG. 5B. It will be appreciated that system 500 as shown in FIGS. 5A-B are merely two examples of a flow control system in which the control techniques described herein can be implemented and that such techniques are applicable to a variety of different systems. For example, chiller 502 may be replaced with a boiler (e.g., boiler 552) and heated fluid may be circulated through coil 550 to provide heating to a building space, as shown in FIGS. 5C-D. In some embodiments, system 500 as depicted in FIGS. 5C-D is designed to prevent freezing inside of heating coil 550. The heated fluid may reject heat (Q̇) in coil 518. For example, pump 504 may not be engaged and fluid within heating coil 550 is not being pumped through system 500 (e.g., the fluid is stagnant within heating coil 550). The heated fluid may then lose heat to the supply air from fan 516 and result in freezing of the fluid.

Moreover, system 500 may include more than one pump, more than one coil, more than three sensors, etc. Coil 518 or a similar component (e.g., coil 550) may generally be a component of a variety of different types of heat exchangers such as shell and tube heat exchangers, plate heat exchangers, and double pipe heat exchangers. The heat exchangers may have a variety of different flow configurations such as countercurrent flow (e.g., counter-flow), parallel flow, crossflow, concurrent flow, and hybrid flow. The heat exchangers may be part of a larger HVAC device such as AHU 106 as described above, or may be part of a chiller system including chiller 102, as described above. The fluid circulated through coil 518 may be water, air steam, refrigerant, oil, water/glycol solution, or another type of fluid. Flow sensor 506, valve 508, and/or actuator 510 may be components of a pressure-independent control valve configured to maintain a flow setpoint independent of pressure applied at the inlet of valve 508.

Detailed Block Diagram of Actuator with External Controller

Figure 6A:
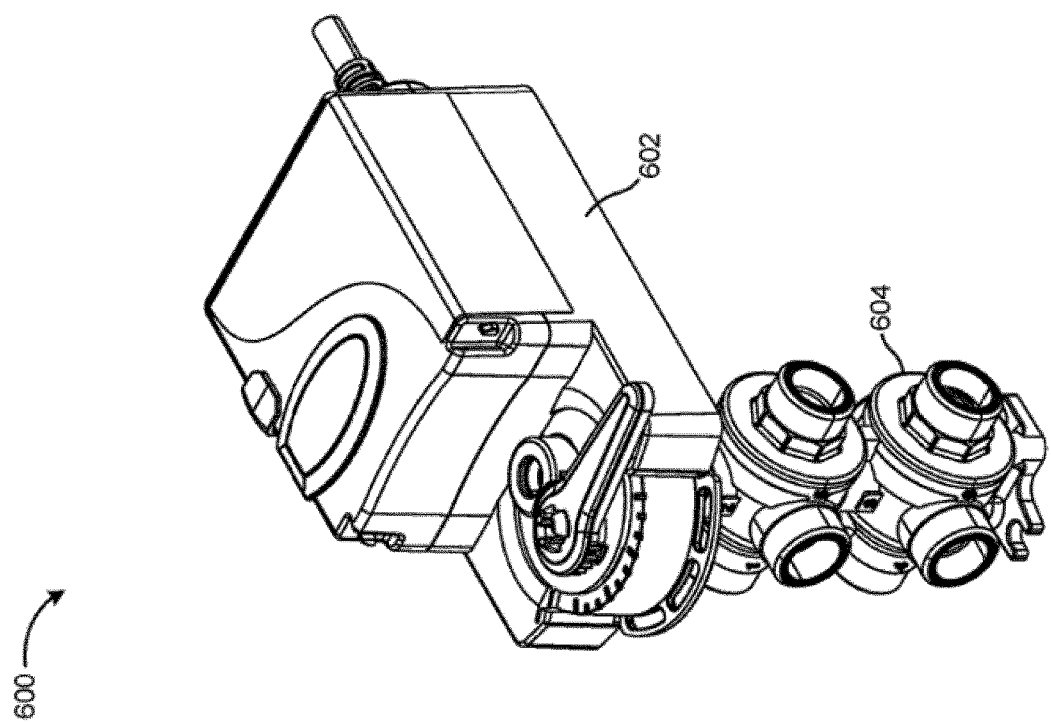
FIG. 6A is a perspective view drawing of the integrated smart actuator device as shown in FIG. 5B, according to some embodiments.

Turning now to FIG. 6A, a view of a smart actuator and valve assembly 600 is shown, according to some embodiments. Assembly 600 is shown to include a smart actuator 602 coupled to a six-way valve 604. In some embodiments, smart actuator 602 is identical or substantially similar to actuator 510, described above with reference to FIGS. 5A-B. Smart actuator 602 may be configured to actuate a valve member of six-way valve 604 and control fluid flow through the valve body. In other embodiments, smart actuator 602 is coupled to a 2-way or 3-way valve, rather than six-way valve 604. In the event that smart actuator 602 is coupled to a 2-way valve, this may allow smart actuator 602 to control and actuate for a single supply line (e.g., supply chiller fluid).

Figure 6B:
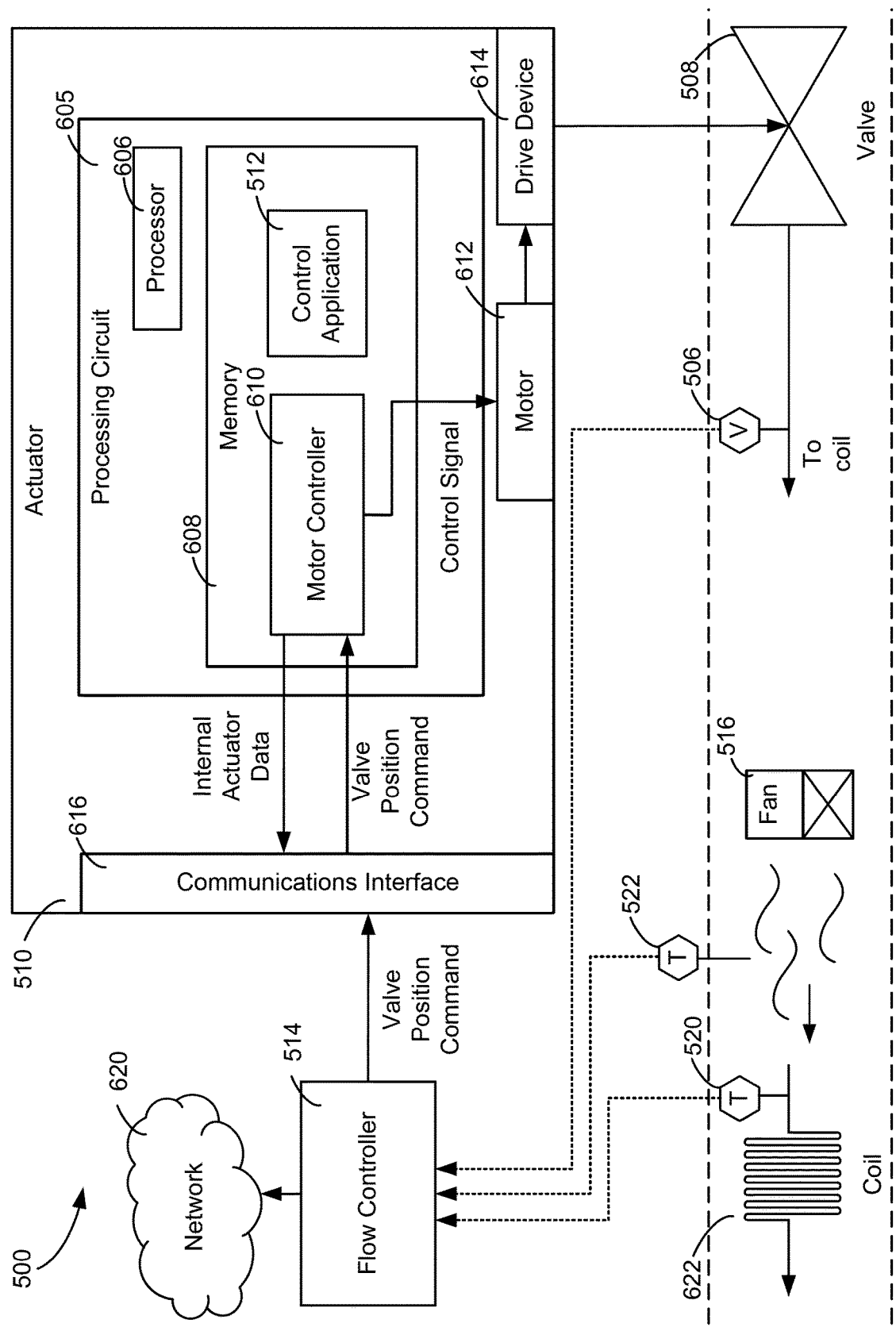
FIG. 6B is a block diagram of a control system which can be used as part of the flow control system of FIG. 5A and FIG. 5C, according to some embodiments.
Figure 6C:
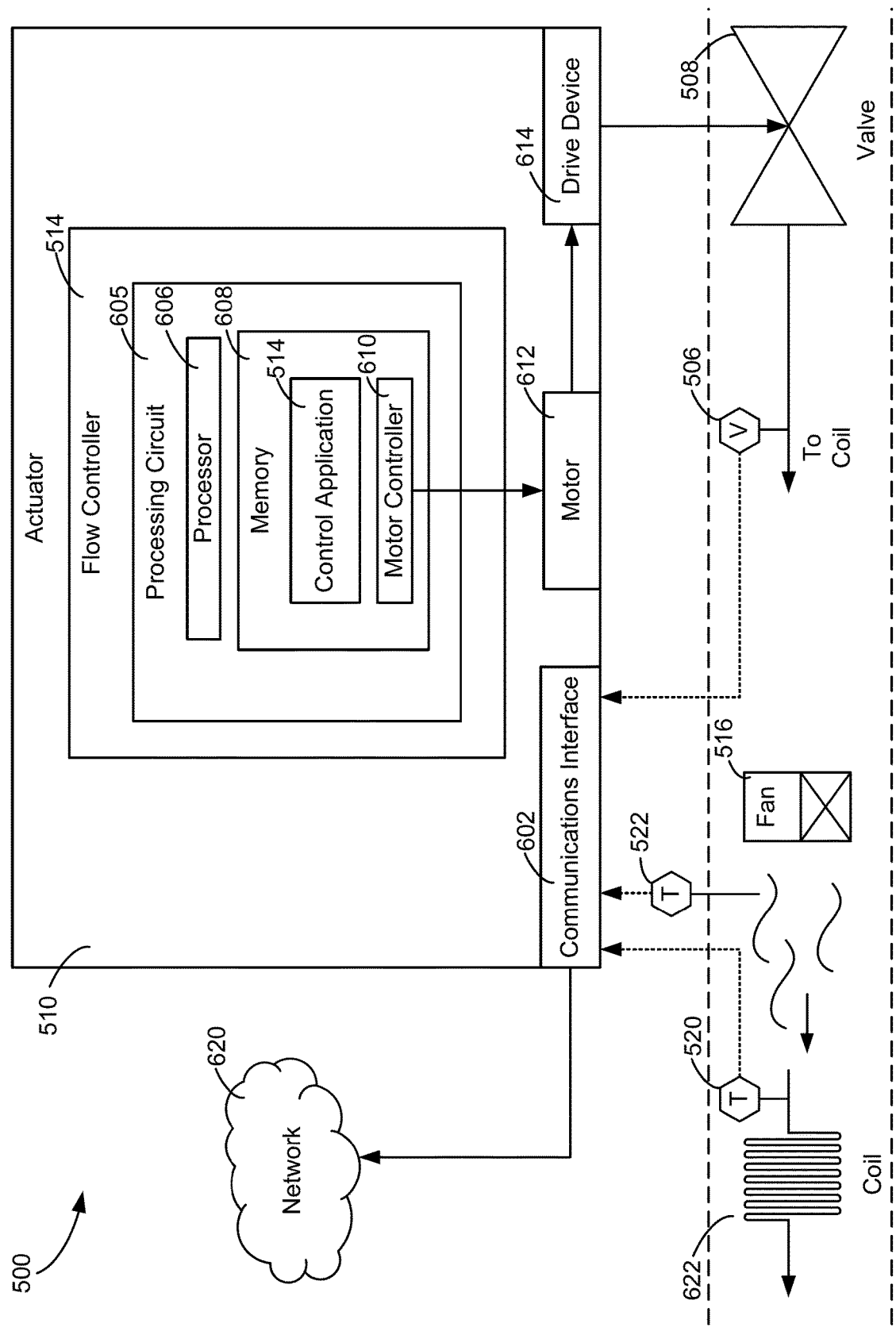
FIG. 6C is a block diagram of a control system which can be used as part of the flow control system of FIG. 5B and FIG. 5D, according to some embodiments.

Referring now to FIGS. 6B-C, embodiments of system 500 in which flow controller 514 is connected to a network are shown. FIGS. 6B-C may represent a more detailed version of system 500, according to some embodiments. FIG. 6B is shown to include actuator 510, flow controller 514, coil 622, sensors 506, 520, 522, valve 508, and network 620. In some embodiments, coil 622 may act as a cooling coil 518 as shown in FIGS. 5A-B or as a heating coil 550 as shown in FIGS. 5C-D.

Actuator 510 is shown to include communications interface 616, processing circuit 605, motor 612, and drive device 614. Communications interface 616 can facilitate communications between actuator 510 and flow controller 514 for allowing user control, monitoring, and adjustment to flow controller 514 and/or valve 508. Interface 616 can facilitate communications between BMS controller 366 and building subsystems 428 (e.g., HVAC, lighting security, lifts, power distribution, business, etc.) through network 620. In some embodiments, interface 616 receives a flow setpoint from flow controller 514. In some embodiments, actuator 510 may transmit actuator data or data regarding system 500 (e.g., temperature data, temperature analytics, status updates, etc.) to a supervisory controller (e.g., BMS controller 366).

Interface 616 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interface 616 can be direct (e.g., local wired or wireless communications) or via communications network 620 (e.g., a WAN, the Internet, a cellular network, etc.). For example, interface 616 can include an Ethernet card and port for sending and receiving data via an Ethernet-based communications link or network. In another example, interface 616 can include a Wi-Fi transceiver for communicating via a wireless communications network. In another example, one or both of interface 616 can include cellular or mobile phone communications transceivers. In one embodiment, communications interface 616 is a power line communications interface and BMS interface 409 is an Ethernet interface. In other embodiments, both communications interface 616 and BMS interface 409 are Ethernet interfaces or are the same Ethernet interface. In some embodiments, network 620 may be substantially similar to network 446.

Motor 612 may be any machine capable of supplying motive power to an external device or component based on control signals. In some embodiments, motor 612 is a brushless DC motor that supplies power to drive device 614 to actuate valve 508. Motor 612 may be controlled by flow controller 514, as shown in FIG. 6B or can be controlled internally by actuator 510, as shown in FIG. 6C. Drive device 614 may be a drive mechanism, a hub, or other device configured to drive or effectuate movement of an HVAC system component (e.g., valve 508). Drive device 614 may be configured to receive a valve stem in order to drive (e.g., rotate) the valve stem, thus opening or closing the valve.

Processing circuit 605 is shown to include processor 606 and memory 608. Processing circuit 605 can be communicably connected to interface 616 and/or flow controller 514 such that processing circuit 605 and the various components thereof can send and receive data via interface 616. Processor 606 can be implemented as a general purpose processor, an application specific integrated circuit (ASIC), one or more field programmable gate arrays (FPGAs), a group of processing components, or other suitable electronic processing components.

Memory 608 (e.g., memory, memory unit, storage device, etc.) can include one or more devices (e.g., RAM, ROM, Flash memory, hard disk storage, etc.) for storing data and/or computer code for completing or facilitating the various processes, layers and modules described herein. Memory 608 can be or include volatile memory or non-volatile memory. Memory 608 can include database components, object code components, script components, or any other type of information structure for supporting the various activities and information structures described herein. According to an example embodiment, memory 608 is communicably connected to processor 606 via processing circuit 605 and includes computer code for executing (e.g., by processing circuit 605 and/or processor 606) one or more processes described herein. In some embodiments, control application 512 is implemented within a single computer (e.g., one server, one housing, etc.). In various other embodiments control application 512 can be distributed across multiple servers or computers (e.g., that can exist in distributed locations).

Still referring to FIG. 6B, memory 608 is shown to include motor controller 610 and control application 512. Control application 512 may be substantially similar in functionality as depicted in FIG. 5A. Motor controller 610 may be configured to receive valve position commands from flow controller 514 to adjust valve 508 to modulate the chilled fluid within chilled fluid loop 524. Flow controller 514 may generate a flow setpoint based on the received temperature measurements from sensors 520, 522. Then, flow controller 514 may transmit a valve position command to actuator 510 in an attempt to reach the flow setpoint. In some embodiments, flow controller 514 is incorporated into control application 512 and actuator 510 acts as the controller to monitor and control system 500, as shown in FIG. 6C.

Detailed Block Diagram of Smart Actuator

Referring now to FIG. 6C, an alternative design to system 500 is shown. FIG. 6C illustrates actuator 510 communicably connected to network 620. FIG. 6C is shown to include actuator 510, coil 622, sensors 506, 520, and 522, valve 508 and network 620.

As described above with reference to FIG. 5B, actuator 510 may incorporate flow controller 514 into its processing to act as the primary controller for system 500. In such an embodiment, actuator 510 would receive sensor data from sensors 506, 520, and 522, and send control signals to valve 508 and, while not shown in FIG. 6C, to fan 516. Actuator 510 would additionally include the processing and control devices for actuating valve 508. For example, communications interface 616 may receive temperature data from inlet temperature sensor 520 and flow sensor 506. Flow controller 514 can then process the sensor data and determine a flow setpoint necessary to increase the temperature of the chilled fluid through system 500. Motor controller 610 can receive the setpoint and engage motor 612 and drive device 614 to actuate the valve to achieve the flow setpoint.

Actuator Functionality

Figure 7:
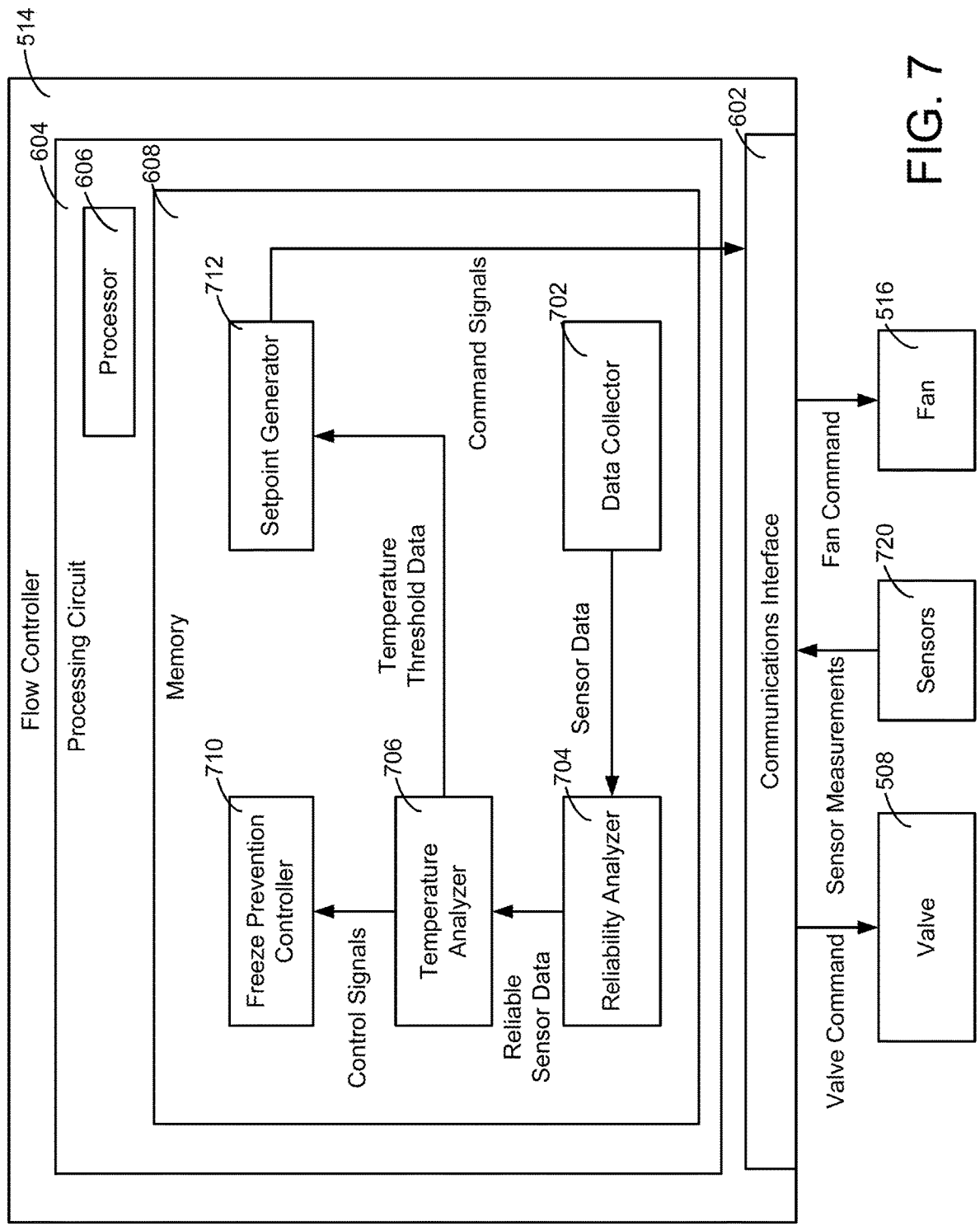
FIG. 7 is a block diagram of a flow controller which can be used as part of the flow control system of FIGS. 5A-D, according to some embodiments.

Referring now to FIG. 7, a detailed block diagram of flow controller 514 is shown, according to an exemplary embodiment. Flow controller 514 is shown to include communications interface 616 and processing circuit 605. Processing circuit 605 is shown to include processor 606 and memory 608. Memory 608 is shown to include data collector 702, reliability analyzer 704, temperature analyzer 706, hazardous temperature indicator 708, freeze prevention controller 710, and setpoint generator 712. In some embodiments, the operations and functionality executed within processing circuit 605 may be performed within flow controller 514 as shown in FIG. 6B or within actuator 510 as shown in FIG. 6C.

Flow controller 514 is configured to be communicably coupled to valve 508, sensors 720, and fan 516. Sensors 720 may include one or more sensors configured to monitor and transmit temperature or flow data to flow controller 514 (e.g., inlet temperature sensor 520, OAT sensor 522, flow sensor 506).

Data collector 702 can be configured to receive sensor data from communications interface 616. In some embodiments, data collector 702 is not included in flow controller 514 and the data received by interface 616 is sent directly to reliability analyzer 704.

Reliability analyzer 704 may be configured to determine if any temperature measurements are considered unreliable. In some embodiments, reliability analyzer 704 determines that any abnormal measurements are unreliable. The term "abnormal" as used herein may refer to any measurement that is unrealistic for the situation or outside the measurable range of the respective sensor. For example, if flow controller 514 receives a temperature measurement of 1000° C. but the temperature sensor from which the measurement is received is only capable of accurately measuring within a range of −10° C. and 100° C., reliability analyzer 704 would consider that measurement abnormal and would send a signal indicative of flow controller 514 receiving unreliable measurements. Similarly, if a temperature of 1000° C. would not be possible for the situation given the thermal and physical limitations of the system and/or fluid, the temperature measurement may be considered abnormal and therefore unreliable. The threshold for abnormal measurements may be determined by establishing an abnormal temperature threshold for temperature measurements (e.g., greater than 300° C., less than −100° C., etc.). If any measurement received is outside the abnormal temperature threshold, the measurements are considered unreliable.

In another embodiment, reliability analyzer 704 determines that temperature measurements which change substantially in short periods of time are considered unreliable. For example, flow controller 514 receives a first temperature measurement of 6° C. After a short period of time (e.g., less than 15 seconds), flow controller 514 receives another temperature measurement significantly higher than the first temperature measurement (e.g., 25° C.) or significantly lower than the first temperature measurement (e.g., −10° C.). In some embodiments, temperature measurements may be considered significantly different if the temperature is less than or greater than a set amount of degrees (e.g., 5° C.) than the previous measurement. In other embodiments, temperature measurements may be considered significantly different if the temperature difference between two measurements is so great that chilled fluid within a building HVAC system would not, under normal circumstances, change temperatures that radically in such a short period of time. In some embodiments, short periods of time may be less than 10 seconds or even less than 5 seconds. If a measured temperature changes by more than a threshold amount within a threshold period of time, one or both of the measurements may be considered unreliable.

In another embodiment, reliability analyzer 704 determines that temperature measurements are unreliable if the signal from the temperature sensor has significant noise. For example, a measurement signal with a high variance, standard deviation, or other noise metric (e.g., above a threshold value) may indicate that a high amount of noise is present in the signal, which may render the measurement unreliable. Similarly, a temperature measurement may be considered unreliable if the measurement itself does not change over a long period of time (e.g., a stuck sensor) or changes by an amount within typical noise bandwidth for the temperature sensor. In general, temperature sensors supply a voltage signal to a controller that is proportional to the temperature being monitored (e.g., 1V represents 0° C., 5V represents 20° C.). In some embodiments, a voltage signal that is in a substantially lower range than a typical temperature sensor range (e.g., Volts) such as microvolts, is indicative of noise and reliability analyzer 704 would send a signal indicative of flow controller 514 receiving unreliable measurements. In some embodiments, noise may be due to electromagnetic interference, circuit malfunctions, mechanical vibrations, increase in temperatures, or any combinations thereof.

Temperature analyzer 706 may be configured to receive sensor data from reliability analyzer 704 and determine if the measurements are below a temperature threshold. In some embodiments, the temperature threshold is established based on the freezing temperature of a fluid (e.g., water) and the energy required to overcome the latent heat of fusion. As described above with reference to FIG. 5A, the temperature threshold may be different for each sensor, depending on the reliability and accuracy of the sensor. Temperature analyzer 706 may take into account several thermodynamic factors regarding the phase transition of the fluid.

In some embodiments, it is difficult to damage a coil due to freezing if both: (a) the temperature of the fluid entering the coil is greater than the liquid phase change temperature and (b) the fluid mass flow rate is greater than or equal to one-tenth of the coil design mass flow rate, assuming the coil is not air bound to prevent the fluid from flowing. This may be consistent with a thermodynamic and heat transfer analysis. The amount of heat transferred between the air and liquid streams in a counter flow coil is limited by:

$$\dot{Q}_{coil} = C_{min} \frac{1 - \exp[-NTU \cdot (1-C_r)]}{1 - C_r \cdot \exp[-NTU \cdot (1-C_r)]} \cdot (T_{h,i} - T_{c,i}) \quad (1)$$

$$C_{min} = \min\{cp_{liq} \cdot \dot{m}_{liq}, cp_{air} \cdot \dot{m}_{air}\} \quad (2)$$

$$C_r = \frac{\min\{cp_{liq} \cdot \dot{m}_{liq}, cp_{air} \cdot \dot{m}_{air}\}}{\max\{cp_{liq} \cdot \dot{m}_{liq}, cp_{air} \cdot \dot{m}_{air}\}} \quad (3)$$

$$NTU = \frac{UA}{C_{min}} \quad (4)$$

The equations above represent general thermodynamics equation relating to heat transfer in a heat exchanger coil. Specifically, Equations (1-4) are used in a method, known as the NTU method, for determining the maximum effective heat transfer inside of a heat exchanger. In some embodiments, the equations described herein, particularly equations regarding heat transfer and general thermodynamics may be incorporated into a heat transfer model. For example, the equations may be used to calculate a threshold flow rate of the liquid through coil 622 such that the liquid is prevented from freezing within coil 622. Equation (1) represents the effectiveness of a counter-current flow heat exchanger. In some embodiments, a counter-flow heat exchanger is one in which the direction of the flow of one of the working fluids is opposite to the direction of the flow of the other fluid. Coil 622 may be implemented as a counter-flow heat exchanger. Specifically, Equation (1) is the effective heat transfer of a counter-flow heat exchanger where $\dot{Q}_{coil}$ (J/s) is the heat transfer of the coil and $C_{min}$ is the lowest heat capacity rate of either the hot fluid or cold fluid. In some embodiments, a heat capacity rate as described herein is the quantity of heat a fluid of certain mass flow rate is able to absorb or release per unit temperature. For example, if the heat capacity rate of the hot fluid $C_h$ was greater than the heat capacity rate of the cold fluid $C_c$, the value of $C_{min}$ equals $C_c$. Further, $T_{h,i} - T_{c,i}$ represents the temperature difference between the inlet temperature of the hot stream and the inlet temperature of the cold stream. A value $q_{max}$ may be determined that represents the maximum heat that could be transferred between fluids, per unit time:

$$q_{max} = C_{min} * (T_{h,i} - T_{c,i}) \quad (5)$$

Multiplying $q_{max}$ by the effectiveness of a counter-current flow heat exchanger, shown in Equation 1 as $$\left[ \frac{1 - \exp[-NTU \cdot (1-C_r)]}{1 - C_r \cdot \exp[-NTU \cdot (1-C_r)]} \right],$$

yields the maximum effective heat transfer within a counter-flow heat exchanger.

Equations (2-3) represent supporting equations to solve Equation (1). For example, the mass flow rate of a fluid, $\dot{m}_{liq}$ and the specific heat of a fluid, $cp_{liq}$ may be determined which, when multiplied together, yield the heat capacity rate of the fluid, as shown in Equation (2). After determining which medium has the lowest heat capacity rate, the lowest heat capacity rate can then be used to further calculate Equation (1). Equation (3) represents the heat capacity ratio between the minimum heat capacity rate and the maximum heat capacity rate, and Equation (4) represents the number of transfer units (NTU) where the variable U is the overall heat transfer coefficient and A is the heat transfer area. Determining the NTU of a heat exchanger is indicative of its size and heat transfer capabilities. Similar effectiveness relationships can be derived for concentric tube heat exchangers shell and tube heat exchangers, and other heat exchanger types as described above. These relationships are differentiated from one another depending on the type of the flow (e.g., counter-current, concurrent, or cross flow, etc.), the number of passes (in shell and tube exchangers) and whether a flow stream is mixed or unmixed.

For a liquid to freeze, it must be cooled sensibly to the fusion phase change temperature and the additional amount of heat equal to the latent heat of fusion must be removed. The specific heat of water, $c_{pw}$, (i.e., number of Joules required to change the temperature of 1 kg by 1 degree Celsius) is approximately 4,184 J/kg° C. Additionally, the latent heat of fusion, $h_{l-s}$, required to change 1 kg of water at the phase change temperature to ice is approximately 335,500 J/kg. The latent heat of fusion is approximately 80 times that of the specific heat of water, indicating that a large amount of heat must be removed from water at its phase change temperature before it will transition from liquid to ice within the time it resides within coil 622. This is shown in Equations 5 and 6 below:

$$\therefore \text{ice can form only if:} \tag{6}$$
$$C_{min} \frac{1 - \exp[-NTU \cdot (1-C_r)]}{1 - C_r \cdot \exp[-NTU \cdot (1-C_r)]} \cdot (T_{h,i} - T_{c,i}) > \frac{h_{l-s}}{\Delta t_{coil}}$$

$$\Delta t_{coil} = \frac{L_{tube}}{\dot{V}_w} \tag{7}$$

Generally, Equation (6-7) are stating that ice can form only if the maximum effective heat transfer is greater than the latent heat of fusion of water divided by the time it resides in the coil. As such, increasing velocity of the flow will decrease the time that the fluid is in the tube, thus reducing the chances of ice forming. These equations above further support coil 622 becoming damaged only after its internal volume is entirely filled with ice. In some cases, ice formations will start on the inside surface of coil 622 which reduces coil 622 conductance area product (U*A). Equations (1) and (4) show how a smaller UA reduces the heat transfer rate inside of coil 622. In some embodiments, temperature analyzer 706 sets the temperature threshold to be the freezing temperature of water (i.e., 0° C. or 32° F.) plus an additional temperature value to account for error (e.g., approximately 1.1° C. or 34° F.).

In some embodiments, the temperature of the cold fluid that will induce freezing, $T_{c,i}$, is solved for in Equation 6 using known system parameters and the temperature of the hot fluid, $T_{h,i}$. For example, temperature analyzer 706 receives a temperature measurement of the hotter fluid (e.g., the fluid at the outlet of coil 622) and the flow rate of the fluid through coil 622. Using these variables and knowing the various specific heat rate, latent heat of fusion of the fluid in coil 622, and length of the coil, temperature analyzer 706 may solve for, $T_{c,i}$ and to determine if a temperature threshold for the temperature of the fluid at the inlet of coil 622. This calculation may be performed to prevent freezing within a cooling coil, such as coil 518 as shown in FIGS. 5A-B.

In other embodiments the Equation 6 may be calculated to prevent freezing within a heating coil, such as coil 550 as shown in FIGS. 5C-D. For example, the temperature of the hot fluid that will be induce freezing $T_{h,i}$, will be solved for, as the hotter fluid is typically within the coils of a heating coil, rather than on the outside of the coils.

In some embodiments, temperature analyzer 706 determines if a temperature measurement is below the temperature threshold by determining if the measurement is a lower temperature than a predetermined threshold temperature. Specifically, preventative freeze actions are engaged if the measured temperature is below a fixed threshold (e.g., 0° C.), which is predetermined. No other control logic may be required to determine if the measured temperature is below the threshold. If the measurement is below the threshold, control signals may be sent to freeze prevention controller 710 to engage freeze prevention actions. This is described in greater detail below.

Temperature analyzer 706 may established three levels (e.g., states, conditions, etc.) in which, when one or more temperature thresholds are passed, different freeze prevention actions are engaged. In some embodiments, the three levels are considered part of a multi-tiered temperature threshold wherein each the first level has a higher temperature threshold than the second temperature threshold. Temperature analyzer 706 may establish less or more than three levels. Temperature analyzer 706 may rely on measurements received from sensors 720 to make control logic decisions (e.g., determine if freeze prevention actions are required, etc.). Sensors 720 may include one or more flow sensors and/or one or more temperature sensors. In some embodiments, sensors 720 include the configuration and functionality of inlet temperature sensor 380, OAT sensor 382, and outlet temperature sensor 384.

In a first level, temperature analyzer 706 may establish a first temperature threshold. In other embodiments, the first temperature threshold and other temperature thresholds are provided by a user or other external source. This first level may be the initial level between normal operation of the system and an operation wherein freeze prevention actions may need to be taken to prevent freezing within coil 622. The first threshold may be defined as the freezing temperature of water (i.e., 0° C.) plus an additional component (e.g., safety component) to act as a safety precaution (e.g., 2° C., 10° C., etc.). In the event that temperatures received by flow controller 514 are below the first temperature threshold, a valve command may be transmitted to valve 508 to open into a predetermined position. In some embodiments, valve 508 opens fully (i.e., 100% open). In other embodiments, valve 508 opens to a different position (e.g., 80% open). Flow controller 514 may command valve 508 to open and allow greater flow velocity, because, as stated above, increasing the flow velocity of the fluid reduces increases the amount of energy (e.g., heat (J)) required to freeze the fluid. As shown in Equation (6) above, ice can form only if the maximum effective heat transfer is greater than the latent heat of fusion of water divided by the time it resides in the coil. As such, increasing velocity of the flow will decrease the time that the fluid is in the tube, thus reducing the chances of ice forming.

In some embodiments, flow controller 514 may open valve 508 to predetermined position when the first temperature threshold is reached. For example, flow controller 514 may be implemented in place of AHU controller 330 within airside system 300, as shown in FIG. 3. A first temperature threshold may be established at 4° C. (e.g., component of the freezing temperature of water (0° C.) plus a safety component (4° C.)). At a first instance in time, the fluid may be chilled and pumped through piping 342 to cooling coil 334 at a temperature of 5° C., as recorded by inlet temperature sensor 830. Additionally, OAT sensor 832 may record an air temperature within supply air duct 312 being −8° C., thereby indicating that the fluid within coil 334 is a higher temperature than the air within supply air duct 312 and will reject heat to the air. At a second instance in time, inlet temperature sensor 830 may record a temperature measurement of the fluid being 3.8° C. Flow controller 514 may, through temperature analyzer 706, receive the temperature measurement at the second instance in time and, through freeze prevention controller 710, command valve 508 to open to a maximum position. Valve 508 opens to a maximum position, thereby increasing the flow velocity of the fluid and decreasing the amount time that the fluid resides in cooling coil 334. This reduces the amount of heat transfer within cooling coil 334 and allows for a lower air temperature around cooling coil 334 without freezing the fluid within.

In some embodiments, flow controller 514 may open valve 508 and increase the velocity of the fluid to a point until Equation (6) is no longer satisfied. For example, flow controller 514 may be implemented in place of AHU controller 330 within airside system 300, as shown in FIG. 3. Further, flow controller 514 may receive temperature measurements that are substantially similar as those depicted in the above embodiment. After receiving the temperature measurement at the second instance in time, flow controller 514 commands valve 508 to open to a position such that Equation 6 would no longer be satisfied. In the exemplified embodiment, flow controller 514 may receive temperature measurements from outlet temperature sensor 384 and a flow sensor within the piping of cooling coil 334, which may be similar to flow sensor 506 as shown in FIGS. 5A-B. These received measurements may allow temperature analyzer 706 to solve Equation 6 as shown above. The measurement from outlet temperature sensor 384 may represent the temperature of the hot fluid, $T_{h,i}$, as the temperature of the fluid will generally increase within a cooling coil (e.g., cooling coil 334) as it absorbs heat from the surrounding air. In some embodiments, the measurement from outlet temperature sensor 384 may represent the temperature of the cold fluid, $T_{c,i}$, as the temperature of the fluid will generally decrease within a cooling coil (e.g., cooling coil 334) if the temperature of the air is lower than the temperature of the fluid and the fluid rejects heat to the surrounding air. The measurement from flow sensor 506 may represent the flow rate within coil 334, $\dot{V}_w$, which can be used to determine the time that the fluid resides in the coil. Other factors (e.g., latent heat of fusion, length of the coil, etc.) may be known prior to receiving the temperature measurements and may be provided by a user or other external source. After calculating Equation (6), temperature analyzer 706 may determine a safe velocity of the fluid at which the fluid would no longer be in danger of freezing, and flow controller 514 will command valve 508 to achieve that safe velocity.

In a second level, temperature analyzer 706 may established a second temperature threshold. The second temperature threshold may be considered a more critical temperature threshold, and, in the event of the fluid passing the second temperature threshold, results in more significant freeze prevention actions than those that were engaged at the first level. These actions include but are not limited to reducing the speed of a fan (e.g., fan 338), closing a damper (e.g., damper 320) to reduce air flow, opening a return damper (e.g., damper 318), or increasing the velocity of the fluid flow by opening a valve (e.g., valve 508). In some embodiments, increasing the fluid flow at the first level may not increase the temperature of the fluid enough to place system 300 in a safe operational mode. As such, the temperature may continue to decrease and pass the second level.

For example, flow controller 514 may be implemented in place of AHU controller 330 within airside system 300, as shown in FIG. 3. A first temperature threshold may be established at 4° C. (e.g., component of the freezing temperature of water (0° C.) plus a safety component (4° C.)). A second temperature threshold is established at 0° C. At a first instance in time, the fluid may be chilled and pumped through piping 342 to cooling coil 334 at a temperature of 5° C., as recorded by inlet temperature sensor 830. OAT sensor 832 may record an air temperature within supply air duct 312 being −8° C., thereby indicating that the fluid within coil 334 is a higher temperature than the air within supply air duct 312 and will reject heat to the air. At a second instance in time, inlet temperature sensor 830 may record a temperature measurement of the fluid being 3.8° C. Flow controller 514 may, through temperature analyzer 706, receive the temperature measurement at the second instance in time and, through freeze prevention controller 710, command valve 508 to open to a maximum position.

However, the temperature of the fluid within cooling coil 334 continues to decrease and, at a third instance in time, a temperature is recorded by inlet temperature sensor being −0.4° C. Flow controller 514 may, through temperature analyzer 706, receive the temperature measurement at the third instance in time and, through freeze prevention controller 710, reduce the speed of a fan 338, close damper 320 to reduce air flow across cooling coil 334, open return damper 318, and increase the velocity of the fluid flow by opening valve 508 to a more open position, if valve 508 is not already fully open. This may increase the temperature of the fluid to a temperature that is above both the second and first thresholds, thereby placing airside system 300 in a safe operating mode.

In a third level, temperature analyzer 706 may be unable to receive temperature measurements from inlet temperature sensor 380. At any temperature or stage in engaging freeze prevention actions, flow controller 514 may, after failing to receive accurate temperature readings from inlet temperature sensor 380, replace receiving the temperature measurements from inlet temperature sensor 380 with receiving the temperature measurements from OAT sensor 832. In some embodiments, the temperature measurements from OAT sensor 832 may not be as accurate by allow flow controller 514 to receive an approximate temperature of the fluid within cooling coil 334. The processes and methods for flow controller 514 transitioning between using inlet temperature sensor 580 and OAT sensor 582 is described in greater detail below with reference to FIG. 8.

In some embodiments, the rate of freezing within coils 334, 336 may be predicted based on the acceleration (i.e., change in flow velocity) of the fluid. Temperature analyzer 706 may be configured to receive flow ratings within cooling coil 334 from flow sensor 506. Temperature analyzer 706 may determine a rate at which the flow ratings are changing, before and after freezing occurs. This may be indicative of when complete freezing occurs within the coil. As ice forms on the outer edge of the coil, the fluid as a smaller cross-sectional area to travel through, thus decreasing the flow rate of the fluid. Temperature analyzer 706 may process the change in flow rates over time and predict a time in which cooling coil 334 will freeze.

In some embodiments, temperature analyzer 706 determines if a temperature measurement is below the temperature threshold by receiving a temperature measurement and calculating the temperature threshold. The threshold may be calculated using the equations discussed above and other measured inputs to the system (e.g., temperature measurements, other variables in the system, specific heat of the fluids, etc.). This allows for a dynamic temperature threshold that varies depending on the speed of the fluid, the type fluid within the heat exchanger (e.g., water, water/glycol solution, etc.), or the dimensions of the heat exchanger tubes. If the measured temperature is found to be below the calculated temperature threshold, temperature analyzer 706 may send a signal to hazardous temperature indicator 708 indicating that freeze prevention actions may need to be engaged. In other embodiments, the threshold may be a threshold for the rate of heat transfer rather than a temperature threshold. A calculated rate of heat transfer may be compared to a rate of heat transfer threshold. In some embodiments, the threshold rate of heat transfer is calculated based on the latent heat of fusion and an estimated amount of time that the liquid will be within the coil (e.g., Equation 6), wherein the left side of Equation (6) represents the calculated rate of heat transfer, as shown in Equation (1).

In some embodiments, temperature analyzer 706 determines if freeze prevention actions need to be engaged based on continuously monitoring if one or more of the heat transfer equations described above are satisfied. Specifically, temperature analyzer 706 may not generate a threshold by which to compare sensor measurements. Rather, temperature analyzer 706 may directly use the temperature measurements from sensors 520,522 as variables for Equation 6 (e.g., $T_{c,i}$) to determine if Equation 6 is satisfied and engage in freeze prevention actions based on whether the equation is satisfied. For example, temperature analyzer 706 may receive certain measured inputs or system parameters relating to the maximum effective heat transfer of the coil and the dimensions of the heat exchanger tube (e.g., variables in Equation 6). Temperature analyzer 706 may then continuously monitor whether or not Equation 6 is satisfied. In some embodiments, temperature analyzer 706 is receiving new temperature values and flow values at every given period of time (e.g., every 10 seconds, every minute, etc.) and uses these new values to recalculate Equation 6 and determine if it Equation 6 is still satisfied. The freeze prevention actions that may be engaged when Equation 6 is satisfied may continue to be engaged until Equation 6 is no longer satisfied. In the event that temperature analyzer 706 determines that freeze prevention actions need to be engaged, temperature analyzer 706 may send a warning signal to freeze prevention controller 710 to engage in freeze prevention actions. This signal may act as a warning (e.g., alert, alarm, etc.) that liquid may begin freezing within the coil given current system conditions.

Freeze prevention controller 710 may be configured to engage in any of a variety of actions to prevent the freezing of water in coil 622. Such actions may include, for example, causing valve 508 to move to a fully open position to maximize the flow rate of the chilled fluid through valve 508, notifying building occupants through an alarm system, disengaging fan 516, or any combination of these. In some embodiments, freeze prevention controller 710 may only engage when control signals from temperature analyzer 706 are received that indicate temperature measurements are below the temperature threshold and hazardous to the system. When this occurs, flow controller 514 may send control signals to actuator 510 to open valve 508 completely, allowing maximum flow through the valve. Flow controller 514 may also engage alarm services (e.g., notify building occupants) through network 446. In some embodiments, these alarm services include a set of procedures that, when initiated, notifies building occupants of a situation and performs actions to prevent freezing within coil. Freeze prevention controller 710 may be connected to security subsystem 438, HVAC subsystem 440, or any other subsystem through network 620 to engage alarm services.

Setpoint generator 712 may be configured to generate the flow setpoint for the chilled fluid and transmit a valve position command to valve 508 in an attempt to reach the setpoint. Setpoint generator may be substantially incorporated into freeze prevention controller 710. The flow setpoint may is sent to valve 508 in an attempt to decrease the potential of freezing within coil 622. As referenced above, freezing may occur when the maximum effective heat transfer of the fluid is greater than the latent heat of fusion of the fluid divided by the time the fluid is in the coil. As such, setpoint generator 712 may attempt to increase the velocity of the fluid (thus decreasing $\Delta t_{coil}$, the time that the fluid is in the coil). Setpoint generator 712 may also set the setpoint at a flow (e.g., velocity) that is only needed to make Equation 6 not be satisfied (e.g., increase the flow so that ice can no longer form).

Chilled Fluid Circuit Processes

Figure 8:
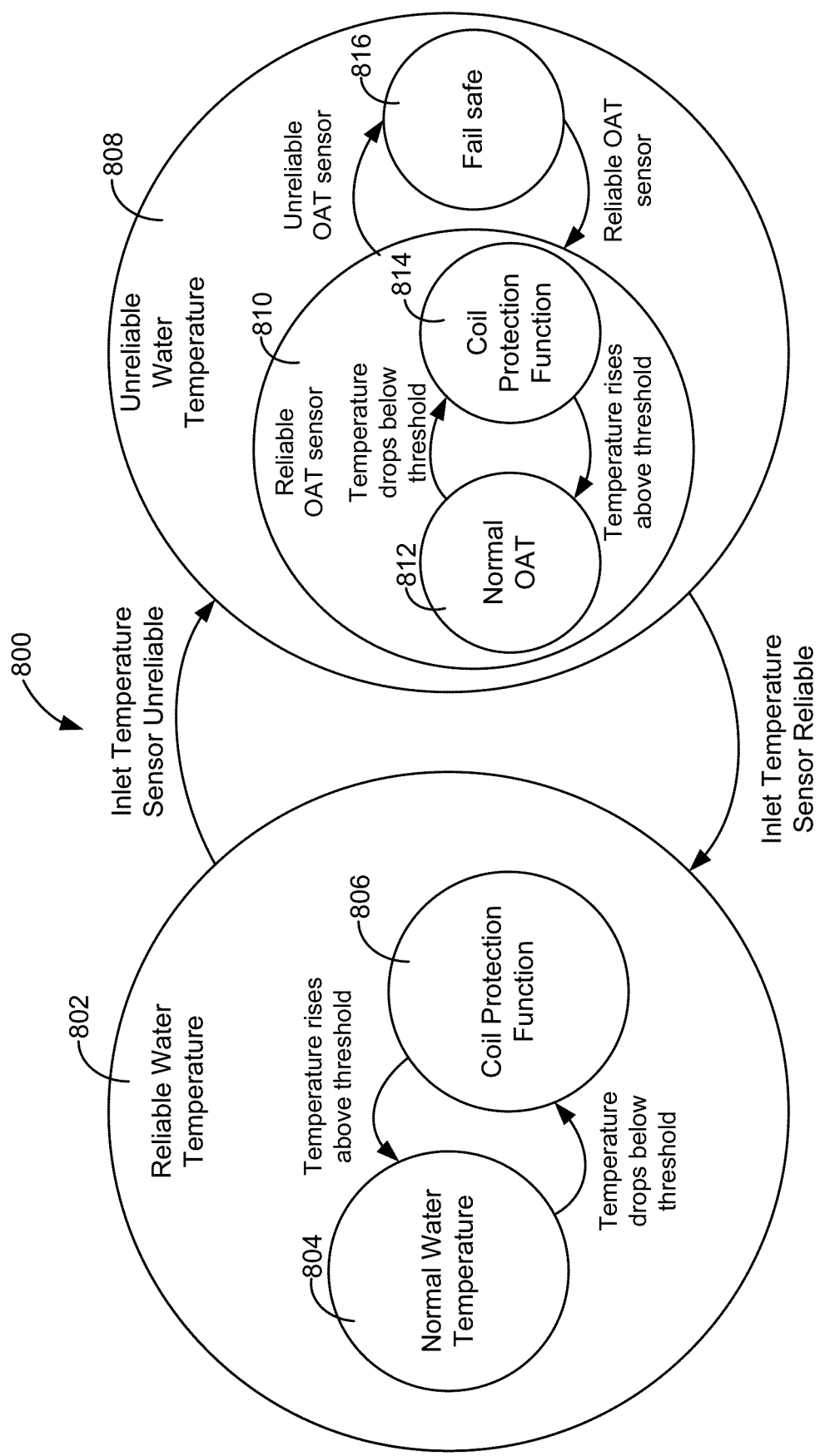
FIG. 8 is a state machine diagram of a process to prevent freezing inside of an HVAC coil which can be used as part of the flow control system of FIGS. 5A-B, according to some embodiments.

Referring now to FIG. 8, a state transition diagram 800 is shown. State transition diagram 800 may be implemented inside of system 500 as shown in FIGS. 5A-B. State transition diagram 800 is shown to include reliable water temperature state 802 and unreliable water temperature state 808. In the event that inlet temperature sensor 520 provides unreliable readings to flow controller 514, the system may switch from reliable water temperature state 802 to unreliable water temperature state 808. In some embodiments, state 808 may return back to state 802 when measurements from inlet temperature sensor 520 begin providing reliable measurements.

Reliable water temperature state 802 is shown to include normal water temperature state 804 and coil protection function state 806. In some embodiments, normal water temperature state 804 may be engaged when temperature readings from inlet temperature sensor 520 are reliable (i.e., sensor is working properly and providing consistent and reasonable readings) and within normal temperature ranges (i.e., temperature readings are above the temperature threshold for the sensor). When state transition diagram 800 transitions into this state, no actions to prevent coil freezing may be implemented.

Coil protection function state 806 may be engaged when temperature readings from inlet temperature sensor 520 drop below a predetermined threshold. This predetermined threshold may be similar to the threshold described in FIG. 6, where the temperature threshold is near the freezing temperature of water. In some embodiments, state 806 may include flow controller 514 transmitting control signals to engage freeze protection actions.

Unreliable water temperature state 808 is shown to include reliable outside air temperature (OAT) state 810 and fail safe state 816. State 810 may represent that state in which both temperature readings from inlet temperature sensor 520 are unreliable and temperature readings from OAT sensor 522 are reliable. In some embodiments, inlet temperature sensor 520 becomes unreliable, resulting in state transition diagram 800 transitioning to unreliable water temperature state 808. Then, if OAT sensor 522 is providing reliable temperature readings, state transition diagram may transition into reliable OAT sensor state 810.

Reliable OAT sensor state 810 is further shown to include normal OAT sensor state 812 and coil protection function state 814. Normal OAT sensor state 812 may engage when temperature readings are above the threshold established for OAT sensor 522. In some embodiments, state transition diagram 800 may utilize only one temperature threshold for both inlet temperature sensor 520 and OAT sensor 522. Coil protection function state 814 may be engaged when temperature readings from OAT sensor 522 drop below a predetermined threshold. In some embodiments, state 814 may include flow controller 514 transmitting control signals to engage freeze protection actions.

Fail safe state 816 may act as final means of protective action. In some embodiments, state 816 may only be engaged in the event of unreliable temperature readings from both inlet temperature sensor 520 and OAT sensor 522. State 816 may engage in shutting down any non-essential components of an HVAC system (e.g., fan, chiller, etc.) to prevent freezing. For example, in the event that state transition diagram has transitioned into fail safe state 816, flow controller 514 may send control signals to fan 516 to stop operation and to valve 508 to fully open and allow maximum flow. When state transition diagram 800 has transitioned to state 816, flow controller 514, may still be able to provide partial operations within flow control system 500 (e.g., control of valve 508, receiving sensor data, etc.).

Referring now to FIG. 9, a flow diagram of a process 900 for preventing freezing within a cooling coil in a building HVAC system is depicted, according to an exemplary embodiment. Process 900 can be performed by various controllers in a building system. In some embodiments, Process 900 is performed by flow controller 514, alone or in combination with any other components of system 500, as previously described. In other embodiments, control application 512 initiates process 900 alone or in combination with any other components of system 500. In the present embodiment, process 900 is performed by flow controller 514.

Process 900 is shown to include establishing a temperature threshold (step 902). In some embodiments, establishing a temperature threshold is performed by a control device within system 500 (e.g., flow controller 514, control application 512, etc.) and may be established to be a threshold that accounts for both the freezing temperature of the chilled fluid (e.g., water) and a margin of error (e.g., 1.1° C.). In some embodiments, the temperature threshold is set by a user. In some embodiments, the temperature threshold may not include a margin of error and the temperature threshold is the freezing point of the chilled fluid (e.g., 1° C.).

Process 900 is shown to include receiving a temperature measurement from a first temperature sensor monitoring the chilled fluid at an inlet of a coil (step 904). In some embodiments, flow controller 514 receives the temperature measurement from inlet temperature sensor 520. In some embodiments, temperature measurements may be received by either actuator 510 or flow controller 514, as depicted in FIGS. 5-6. This step may be performed by data collector 702, as shown in FIG. 7.

Process 900 is shown to include determining if the temperature measurement from the first temperature sensor is reliable. This step may be performed by reliability analyzer 704, as depicted in FIG. 7. If the temperature measurement from the first temperature sensor is found to be unreliable, process 900 may switch to receiving temperature measurements from a second temperature sensor that monitors air outside of the coil (step 910). If the temperature measurement is found to be reliable, process 900 may then determine if the temperature measurement is lower than the established temperature threshold (908).

Process 900 is shown to include receiving a temperature measurement from a second temperature sensor monitoring the air outside of the coil (step 910). In some embodiments, this step is performed after the first temperature sensor (e.g., inlet temperature sensor 906) is determined to be unreliable. In some embodiments, step 910 is performed by data collector 702 as shown in FIG. 7.

Process 900 is shown to include determining if the temperature measurement from the second temperature sensor is reliable (step 912). This step may be performed by reliability analyzer 704, as depicted in FIG. 7. If the temperature measurement is found to be unreliable, process 900 may engage in freeze prevention actions (step 914). In some embodiments, this is performed as a fail-safe, as both methods for measuring the temperature of the chilled fluid in system 500 (e.g., inlet temperature sensor 520, OAT sensor 522) are unreliable and therefore flow controller 514 cannot receive reliable measurements to make control decisions. If the temperature measurement is found to be reliable, the temperature measurement is then determined if it is lower than the established temperature threshold 9 step 908).

Process 900 is shown to include determining if the temperature measurement is lower than the temperature threshold (step 908). This step may occur after determining that the first temperature measurement is reliable (i.e., "YES" to step 906) or after determining that the second temperature measurement is reliable (i.e., "YES" to step 912). If the temperature measurement is not below the threshold, process 900 may go back to step 904 and monitor temperature measurements from the first temperature sensor (e.g., inlet temperature sensor 520). While not shown in FIG. 9, in the event that the temperature measurement is not below the threshold and the first temperature sensor (e.g., inlet temperature sensor 520) is found to be unreliable, process 900 may go back to step 910 and monitor temperature measures from the second temperature sensor (e.g., OAT sensor 522). The threshold may be similar to the threshold established by temperature analyzer 706 as shown in FIG. 7.

Process 900 is shown to include engaging freeze prevention actions (step 914). Freeze prevention actions may include engaging in any of a variety of actions to prevent the freezing of chilled fluid within coil 622. Such actions may include, for example, flow controller 514 sending control signals to cause valve 508 to move to a fully open position to maximize the flow rate of the chilled fluid through valve 508, notify building occupants through alarm services, disengage fan 516, or any combination of these.

In some embodiments, engaging in freeze prevention actions may further include alarm services. The alarm services may include a set of procedures that, when initiated (e.g., strobe lights, speaker notification, etc.), notifies building occupants of a situation. Step 914 may also include transmitting an alarm message to a user interface to notify the building occupants/workers. A user interface may be any medium in which a user and a computer system (e.g., BMS controller 407) interact. Freeze prevention controller 710 may be connected to security subsystem 438, HVAC subsystem 440, or any other subsystem through network 620 to engage alarm services. In some embodiments, engaging alarm services includes issuing an alarm action, notifying building occupants of an emergency, or any other notification to one or more building occupants of potential freezing within system 500.

In some embodiments, engaging in freeze prevention actions may further include lowering the temperature of the supply chiller fluid pumped into chilled fluid loop 524 as shown in FIGS. 5A-B. For example, a flow sensor may be located at or near an expansion valve located within chiller 502. This expansion valve may be responsible for modulating the amount of liquid refrigerant entering evaporator 503.

When freeze prevention actions are engaged, flow controller 514 may send a control signal to the expansion valve to limit the amount of liquid refrigerant going into evaporator 503. This may allow for less heat transfer from return chiller fluid to the liquid refrigerant and result in a higher temperature of supply chiller fluid (e.g., 8° C.) compared to not limiting the refrigerant entering evaporator 503 (e.g., 6° C.).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A freeze protection system for a heating, ventilation, or air conditioning (HVAC) system, the freeze protection system comprising:
    a temperature sensor positioned at an inlet of a coil within which a liquid is at risk of freezing;
    a fan or damper operable to control a velocity of an airflow across the coil; and
    a controller comprising a processor and memory, the memory storing instructions that, when executed by the processor, cause the processor to:
        obtain a measured temperature of the liquid at the inlet of the coil from the temperature sensor;
        compare the measured temperature of the liquid at the inlet of the coil with a freeze prevention temperature threshold; and
        engage a freeze prevention action comprising operating the fan or the damper to decrease the velocity of the airflow across the coil in response to a determination that the measured temperature of the liquid at the inlet of the coil is less than or equal to the freeze prevention temperature threshold.

2. The system of claim 1, further comprising a valve operable to control a flow rate of the liquid through the coil;
    wherein the freeze prevention temperature threshold is equal to a freeze temperature at which the liquid is predicted to freeze plus a safety temperature; and
    wherein engaging the freeze prevention action comprises operating the valve to increase the flow rate of the liquid through the coil.

3. The system of claim 1, wherein the freeze prevention temperature threshold is equal to a freeze temperature at which the liquid is predicted to freeze.

4. The system of claim 1, wherein the freeze prevention temperature threshold is a multi-tiered threshold comprising a first freeze prevention temperature threshold and a second freeze prevention temperature threshold less than the first freeze prevention temperature threshold;
    wherein the controller is configured to:
        engage a first freeze prevention action in response to a determination that the measured temperature of the liquid at the inlet of the coil is less than or equal to the first freeze prevention temperature threshold; and
        engage a second freeze prevention action, different from the first freeze prevention action, in response to a determination that the measured temperature of the liquid at the inlet of the coil is less than or equal to the second freeze prevention temperature threshold.

5. The system of claim 1, further comprising a valve operable to control a flow rate of the liquid through the coil;
    wherein the controller is configured to:
        use a heat transfer model for the coil to calculate a threshold flow rate of the liquid through the coil sufficient to prevent the liquid from freezing within the coil as a function of the measured temperature of the liquid at the inlet of the coil; and
        operate the valve such that the flow rate of the liquid through the coil is at least the threshold flow rate calculated using the heat transfer model.

6. The system of claim 1, wherein the controller is configured to:
    determine whether the measured temperature of the liquid at the inlet of the coil is unreliable; and in response to a determination that the measured temperature of the liquid at the inlet of the coil is unreliable, switch to using a measured temperature of an airflow with which the liquid exchanges heat within the coil instead of the measured temperature of the liquid at the inlet of the coil to determine whether to engage the freeze prevention action.

7. The system of claim 1, wherein the freeze prevention action comprises causing stagnant liquid within the coil to begin flowing through the coil.

8. A freeze protection controller for a heating, ventilation, or air conditioning (HVAC) system, the freeze protection controller comprising:
 a processor and memory, the memory storing instructions that, when executed by the processor, cause the processor to:
  obtain a measured temperature of a liquid at an inlet of a coil within which the liquid is at risk of freezing from a temperature sensor positioned to measure the temperature of the liquid at the inlet of the coil;
  use a heat transfer model for the coil to calculate a threshold flow rate of the liquid through the coil sufficient to prevent the liquid from freezing within the coil as a function of the measured temperature of the liquid at the inlet of the coil; and
  operate a valve such that a flow rate of the liquid through the coil is at least the threshold flow rate calculated using the heat transfer model.

9. The controller of claim 8, wherein the instructions cause the processor to:
 compare the measured temperature of the liquid at the inlet of the coil with a freeze prevention temperature threshold equal to a freeze temperature at which the liquid is predicted to freeze plus a safety temperature, and
 engage a freeze prevention action comprising operating the valve to increase the flow rate of the liquid through the coil, wherein the valve is operable to control the flow rate of the liquid through the coil.

10. The controller of claim 8, wherein the instructions cause the processor to:
 compare the measured temperature of the liquid at the inlet of the coil with a freeze prevention temperature threshold equal to a freeze temperature at which the liquid is predicted to freeze,
 engage a freeze prevention action comprising operating a fan or a damper to decrease a velocity of an airflow across the coil, wherein the fan or the damper are operable to control the velocity of the airflow across the coil.

11. The controller of claim 8, wherein the instructions cause the processor to:
 compare the measured temperature of the liquid at the inlet of the coil with a multi-tiered threshold comprising a first freeze prevention temperature threshold and a second freeze prevention temperature threshold less than the first freeze prevention temperature threshold;
 engage a first freeze prevention action in response to a determination that the measured temperature of the liquid at the inlet of the coil is less than or equal to the first freeze prevention temperature threshold; and
 engage a second freeze prevention action, different from the first freeze prevention action, in response to a determination that the measured temperature of the liquid at the inlet of the coil is less than or equal to the second freeze prevention temperature threshold.

12. The controller of claim 8, wherein the instructions cause the processor to:
 determine whether the measured temperature of the liquid at the inlet of the coil is unreliable; and
 in response to a determination that the measured temperature of the liquid at the inlet of the coil is unreliable, switch to using a measured temperature of an airflow with which the liquid exchanges heat within the coil instead of the measured temperature of the liquid at the inlet of the coil to determine whether to engage a freeze prevention action.

13. The system of claim 1, wherein the freeze prevention action comprises causing stagnant liquid within the coil to begin flowing through the coil.

14. A method for preventing a liquid from freezing inside a coil of a heating, ventilation, or air conditioning (HVAC) system, the method comprising:
 measuring a temperature of an airflow with which the liquid exchanges heat within the coil;
 comparing the measured temperature of the airflow with a freeze prevention temperature threshold; and
 engaging a freeze prevention action in response to a determination that the measured temperature of the airflow is less than or equal to the freeze prevention temperature threshold.

15. The method of claim 14, further comprising equaling the freeze prevention temperature threshold to a freeze temperature at which the liquid is predicted to freeze plus a safety temperature, wherein engaging the freeze prevention action comprises operating a valve to increase a flow rate of the liquid through the coil, wherein the valve is operable to control the flow rate of the liquid through the coil.

16. The method of claim 14, further comprising equaling the freeze prevention temperature threshold to a freeze temperature at which the liquid is predicted to freeze, wherein engaging the freeze prevention action comprises operating a fan or damper to decrease a velocity of an airflow across the coil, wherein the fan or the damper are operable to control the velocity of the airflow across the coil.

17. The method of claim 14, further comprising:
 establishing the freeze prevention temperature threshold as a multi-tiered threshold comprising a first freeze prevention temperature threshold and a second freeze prevention temperature threshold less than the first freeze prevention temperature threshold;
 engaging a first freeze prevention action in response to a determination that the measured temperature of the airflow is less than or equal to the first freeze prevention temperature threshold; and
 engaging a second freeze prevention action, different from the first freeze prevention action, in response to a determination that the measured temperature of the airflow is less than or equal to the second freeze prevention temperature threshold.

18. The method of claim 14, further comprising using a heat transfer model for the coil to calculate a threshold flow rate of the liquid through the coil sufficient to prevent the liquid from freezing within the coil as a function of the measured temperature of the airflow; and
 operating a valve such that a flow rate of the liquid through the coil is at least the threshold flow rate calculated using the heat transfer model, wherein the valve is operable to control the flow rate of the liquid through the coil.

19. The method of claim 14, further comprising:
 determining whether a measured temperature of the liquid at the inlet of the coil is unreliable; and in response to a determination that the measured temperature of the liquid at the inlet of the coil is unreliable, switching to using the measured temperature of an airflow with which the liquid exchanges heat within the coil instead of the measured temperature of the liquid at the inlet of the coil to determine whether to engage the freeze prevention action.

* * * * *